United States Patent
Chen et al.

(10) Patent No.: US 10,231,254 B2
(45) Date of Patent: Mar. 12, 2019

(54) 5G CLOUD RAN METHOD FOR SYMBOL BY SYMBOL BIT STREAMING

(71) Applicant: Nokia Technologies Oy, Espoo (FI)

(72) Inventors: David Chen, Wilmette, IL (US); Alan Rottinghaus, Barrington, IL (US); David Baietto, Crystal Lake, IL (US); Yuda Luz, Buffalo Grove, IL (US)

(73) Assignee: Nokia Technologies Oy, Espoo (FI)

( * ) Notice: Subject to any disclaimer, the term of this patent is extended or adjusted under 35 U.S.C. 154(b) by 15 days.

(21) Appl. No.: 15/408,874

(22) Filed: Jan. 18, 2017

(65) Prior Publication Data

US 2018/0042040 A1    Feb. 8, 2018

Related U.S. Application Data

(63) Continuation-in-part of application No. 15/229,327, filed on Aug. 5, 2016.

(51) Int. Cl.
   *H04W 72/04* (2009.01)
   *H04W 72/12* (2009.01)
   (Continued)

(52) U.S. Cl.
   CPC ... *H04W 72/1263* (2013.01); *H04W 72/1273* (2013.01); *H04W 88/085* (2013.01); *H04W 92/12* (2013.01)

(58) Field of Classification Search
   None
   See application file for complete search history.

(56) References Cited

U.S. PATENT DOCUMENTS

| | | | | |
|---|---|---|---|---|
| 5,557,798 A | * | 9/1996 | Skeen | G06F 3/0481 705/35 |
| 8,675,544 B1 | * | 3/2014 | Hirsch | H04B 7/2656 370/322 |

(Continued)

FOREIGN PATENT DOCUMENTS

| | | |
|---|---|---|
| WO | WO-2010101328 A1 | 9/2010 |
| WO | WO 2015044871 A1 | 4/2015 |

(Continued)

OTHER PUBLICATIONS

ZTE R3-160805, The capacity requirement for the interface between CU and DU; 2016.

(Continued)

*Primary Examiner* — Bunjob Jaroenchonwanit
(74) *Attorney, Agent, or Firm* — Harrington & Smith

(57) ABSTRACT

An exemplary method includes determining, at a centralized processing apparatus of a wireless network, a first subset of downlink user plane data corresponding to one or more wireless user equipments at least by calculating input data required at each of one or more L1 PHY processing stages of a remote processing apparatus, wherein the first subset includes bits required by a remote processing apparatus to select a first symbol for transmission to the one or more user equipments at a first time slot; and streaming, via a fronthaul interface, the bits of the first subset followed by bits of one or more further subset of downlink user plane data, wherein the bits of the further subset of user plane data includes only the bits required to select by the remote processing apparatus a next symbol for transmission to the one or more of the wireless user equipments at a next time slot immediately following the first time slot.

20 Claims, 16 Drawing Sheets

(51) Int. Cl.
*H04W 88/08* (2009.01)
*H04W 92/12* (2009.01)

(56) References Cited

U.S. PATENT DOCUMENTS

| | | | | |
|---|---|---|---|---|
| 8,738,818 B2* | 5/2014 | Mahajan | ............... | G06F 11/221 |
| | | | | 710/15 |
| 9,264,190 B2* | 2/2016 | Camarda | ............... | H04L 5/0007 |
| 9,515,843 B2* | 12/2016 | Diab | ................. | H04L 12/40136 |
| 9,648,514 B2* | 5/2017 | Blankenship | ......... | H04L 69/322 |
| 9,838,262 B2* | 12/2017 | Bi | ....................... | H04L 12/4633 |
| 2005/0068974 A1* | 3/2005 | Barker | .................. | H04L 49/103 |
| | | | | 370/419 |
| 2005/0141560 A1* | 6/2005 | Muthiah | .................. | H04L 47/10 |
| | | | | 370/474 |
| 2008/0064390 A1* | 3/2008 | Kim | ..................... | H04W 60/00 |
| | | | | 455/425 |
| 2008/0318589 A1* | 12/2008 | Liu | ...................... | H04W 88/08 |
| | | | | 455/453 |
| 2010/0067539 A1* | 3/2010 | Lin | ........................ | H04L 49/90 |
| | | | | 370/419 |
| 2010/0135251 A1* | 6/2010 | Sambhwani | ............ | H04W 8/26 |
| | | | | 370/331 |
| 2010/0197239 A1* | 8/2010 | Catovic | ................. | H04W 24/08 |
| | | | | 455/67.11 |
| 2010/0250646 A1* | 9/2010 | Dunagan | ............. | H04L 67/2804 |
| | | | | 709/203 |
| 2010/0315997 A1* | 12/2010 | Kim | ................. | H04N 21/43615 |
| | | | | 370/328 |
| 2012/0051210 A1* | 3/2012 | Komatsu | ............... | H04L 1/1621 |
| | | | | 370/216 |
| 2012/0135740 A1* | 5/2012 | Hellwig | ............ | H04W 72/0433 |
| | | | | 455/445 |
| 2013/0288729 A1* | 10/2013 | Islam | ................ | H04W 72/0406 |
| | | | | 455/509 |
| 2014/0047061 A1* | 2/2014 | Ehrlich | .................. | H04L 67/322 |
| | | | | 709/213 |
| 2014/0108878 A1* | 4/2014 | Liu | ........................... | H04L 1/16 |
| | | | | 714/748 |
| 2014/0192851 A1* | 7/2014 | Tahir | ...................... | H04L 1/0001 |
| | | | | 375/224 |
| 2014/0204952 A1* | 7/2014 | Gacanin | .................. | H04B 3/542 |
| | | | | 370/400 |
| 2014/0226481 A1* | 8/2014 | Dahod | ............... | H04W 36/0055 |
| | | | | 370/235 |
| 2014/0334305 A1* | 11/2014 | Leroudier | ............ | H04W 24/00 |
| | | | | 370/235 |
| 2015/0133128 A1* | 5/2015 | Xiong | ................... | H04W 36/22 |
| | | | | 455/444 |
| 2015/0146520 A1* | 5/2015 | Zakrzewski | .......... | H04W 24/04 |
| | | | | 370/221 |
| 2015/0215918 A1* | 7/2015 | Wu | ................... | H04W 72/0433 |
| | | | | 370/329 |
| 2015/0281953 A1* | 10/2015 | Liu | ....................... | H04L 9/0869 |
| | | | | 380/283 |
| 2015/0326417 A1* | 11/2015 | Banerjea | ............. | H04L 27/2613 |
| | | | | 370/474 |
| 2015/0382189 A1* | 12/2015 | Zhang | ................... | H04W 12/04 |
| | | | | 380/285 |
| 2016/0134546 A1* | 5/2016 | Anderson | ............... | H04L 47/12 |
| | | | | 370/235 |
| 2016/0156503 A1* | 6/2016 | Rosa de Sousa Teixeira | ............. | |
| | | | | H04L 41/5025 |
| | | | | 370/216 |
| 2016/0179427 A1* | 6/2016 | Jen | ........................ | G06F 3/0625 |
| | | | | 711/147 |
| 2016/0205570 A1* | 7/2016 | Bedekar | ................ | H04W 24/02 |
| | | | | 370/252 |
| 2016/0242147 A1* | 8/2016 | Tarlazzi | .............. | H04W 72/042 |
| 2017/0164215 A1* | 6/2017 | Chen | ..................... | H04W 24/02 |
| 2017/0185556 A1* | 6/2017 | Buttner | ............... | G06F 13/4022 |
| 2017/0257823 A1* | 9/2017 | Ashwood-Smith | ... | H04W 48/18 |
| 2017/0264535 A1* | 9/2017 | Choi | .................. | H04L 45/38 |
| 2018/0013581 A1* | 1/2018 | Fertonani | ............ | H04L 12/4604 |
| 2018/0013597 A1* | 1/2018 | Barbieri | ................. | H04L 27/26 |

FOREIGN PATENT DOCUMENTS

| | | | |
|---|---|---|---|
| WO | WO-2016003983 A1 | 1/2016 | |
| WO | WO 2016039839 A1 | 3/2016 | |

OTHER PUBLICATIONS

Nec et al R3-160767, Options of Functionality Splitting in RAN logical architecture; 2016.

Samsung R3-160679, Function split between central and remote node; 2016.

Intel Corporation R3-161259, RAN PHY Functions Split Options; 2016.

ZTE R3-161219, The peak bitrate requirement for different split options; 2016.

"Massive MIMO Architecture", 3GPP TSG-RAN WG1 #85, R1-164707, Agenda Item: 7.1.6, Qualcomm Incorporated, May 23-27, 2016, 8 pages.

3rd Generation Partnership Project; Technical Specification Group Radio Access Network; Evolved Universal Terrestrial Radio Access (E-UTRA); Physical layer procedures (Release 13), 3GPP TS 36.213, V13.1.1, Mar. 2016. pp. 1-361.

Chang et al. "Impact of Packetization and Functional Split on C-RAN Fronthaul Performance" IEEE International Conference on Communications (ICC), 2016. pp. 1-7.

Jaber et al. "A Joint Backhaul and RAN Perspective on the Benefits of Centralised RAN Functions" IEEE International Conference on Communications Workshops, May 23-27, 2016. 6 pages.

Vu et al. "Power Optimization with BLER Constraint for Wireless Fronthauls in C-RAN" IEEE Communications Letters, 2016, 4 pages.

* cited by examiner

5G CLOUD RAN METHOD FOR SYMBOL BY SYMBOL BIT STREAMING

CROSS REFERENCE TO RELATED APPLICATIONS

This application is a continuation-in-part of U.S. patent application Ser. No. 15/229,327, filed Aug. 5, 2016, the teachings of which is incorporated herein by reference in its entirety.

TECHNICAL FIELD

This specification relates to the transportation of user plane data across a split L1 PHY fronthaul interface.

BACKGROUND

Distributed Base Stations are based on an architecture in which the radio function unit, also known as the remote radio head (RRH), is physically separated from the digital function unit, or baseband unit (BBU). For instance, the RRH can be installed on the top of tower close to the antenna, thereby reducing the loss when compared to traditional base stations in which RF signals have to travel through a long cable from the base station cabinet to the antenna.

C-RAN (Cloud or Centralized radio access network) is an architectural evolution of the distributed base station that allows BBUs to be significantly further away from the RRH, thereby enabling large scale centralized base station deployment.

3GPP has defined various L1 PHY and L2 functions for 4G LTE, along with protocols for the handling of information among the layers. However, the deployment architecture for realizing these functions in a physical system, which includes the fronthaul (FH) connection between the centralized baseband processing and RRH, is not specified. This flexibility means that not all baseband processing functions must necessarily be centralized away from the RRH, and instead the baseband processing functions may be divided between a centralized location and co-location with the RRH. The same is true for 5G networks.

SUMMARY

In a first aspect, this specification describes a method comprising determining, at a centralized processing apparatus of a wireless network, a first subset of downlink user plane data corresponding to one or more wireless user equipments at least by calculating input data required at each of one or more L1 PHY processing stages of a remote processing apparatus, wherein the first subset comprises bits required by a remote processing apparatus to select a first symbol for transmission to the one or more user equipments at a first time slot; and streaming, via a fronthaul interface, the bits of the first subset followed by bits of one or more next subsets of downlink user plane data, wherein the bits of the next subset of user plane data comprise only the bits required to select by the remote processing apparatus a next symbol for transmission to the one or more of the wireless user equipments at a next time slot immediately following the first time slot.

According to second aspect, an apparatus comprises: at least one processor; and at least one memory including computer program code which, when executed by the at least one processor, causes the apparatus to: determine, at a centralized processing apparatus of a wireless network, a first subset of downlink user plane data corresponding to one or more wireless user equipments at least by calculating input data required at each of one or more L1 PHY processing stages of a remote processing apparatus, wherein the first subset comprises bits required by a remote processing apparatus to select a first symbol for transmission to the one or more user equipments at a first time slot; and stream, via a fronthaul interface, the bits of the first subset followed by bits of one or more next subsets of downlink user plane data, wherein the bits of the next subset of user plane data comprise only the bits required to select by the remote processing apparatus a next symbol for transmission to the one or more of the wireless user equipments at a next time slot immediately following the first time slot.

According to a further aspect, a computer program product may comprise a non-transitory computer-readable medium bearing computer program code, which when executed by a device, causes the device to perform: determining, at a centralized processing apparatus of a wireless network, a first subset of downlink user plane data corresponding to one or more wireless user equipments at least by calculating input data required at each of one or more L1 PHY processing stages of a remote processing apparatus, wherein the first subset comprises bits required by a remote processing apparatus to select a first symbol for transmission to the one or more user equipments at a first time slot; and streaming, via a fronthaul interface, the bits of the first subset followed by bits of one or more next subsets of downlink user plane data, wherein the bits of the next subset of user plane data comprise only the bits required to select by the remote processing apparatus a next symbol for transmission to the one or more of the wireless user equipments at a next time slot immediately following the first time slot.

BRIEF DESCRIPTION OF FIGURES

For better understanding of the present application, reference will now be made by way of example to the accompanying drawings in which:

FIG. 6 is an example of mapping between code blocks and time-slot symbols when the split fronthaul interface is located between the channel coding and rate matching stages;

FIG. 14A and FIG. 14B show a precoding matrix for two antenna spatial multiplexing and a precoding matrix for four antenna spatial multiplexing, respectively;

DETAILED DESCRIPTION

Figure 1:
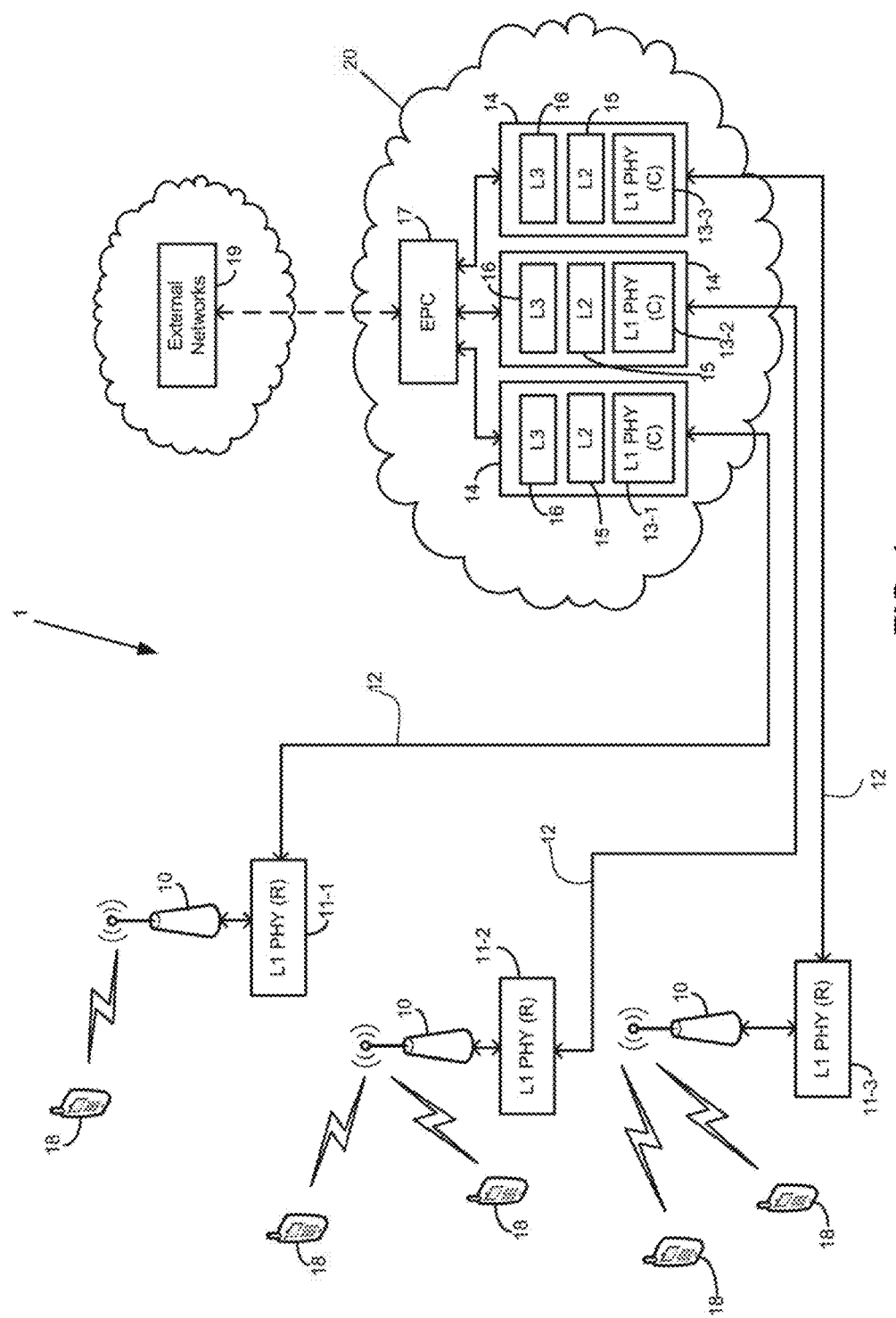
FIG. 1 is a schematic illustration of an example of a C-RAN architecture including plural remote radio heads each locally coupled with a respective remote L1 PHY processing apparatus, which is connected via a split fronthaul interface to a corresponding centralized L1 PHY processing apparatus.

In the description and drawings, like reference numerals refer to like elements throughout.

Typically in LTE an eNB radio unit includes all of the Physical layer processing. In 4G/5G Cloud-Ran some of the Physical Layer blocks could be moved from the eNB to a cloud where computing resources could be shared by two or more eNBs. Doing so may save the network operator in capital expenditure (CAPEX) cost as well as in lower operation cost (OPEX). These benefits will increase as more and more of the computing tasks are moved from the eNB to the cloud.

Splitting some of the PHY functions between the eNB and the cloud creates new issues that must be resolved. Some of these issues include: the requirement of a new interface; (b) the interface must support 5G speeds; (c) the interface must introduce low latency in order to keep the HARQ timing of 4 mSec.

Using fiber cables can solve the speed issue, however in the downlink (DL) moving more and more blocks from the eNB to the cloud means a significant larger traffic load, which can increase both CAPEX and OPEX to the point where all the benefits are lost. For example the data rate at the iFFT is 10 times larger than the data rate at the encoder. It is clear the optimal split is somewhere in between the encoder and the iFFT stages, however this creates a new problem. At the encoder a codeword is created which will take a full 1 millisecond to transmit over the air, but the iFFT makes a conversion every symbol time (~71 μSec). This problem can increase the latency and the HARQ could fail meeting its timing requirements.

Typically, a burst includes all of the bits required for the current 1 mSec TTI, but the burst is only 71 μSec long. Other more practical choices for the length of the burst include 2×~71 μSec or 3×71 μSec burst length, which add some extra delay, but saves in data rates. In all of these choices the data is passed at a small latency (of 71 μSec x1or x2 or x3). However the link will need to deal with traffic at 1000/71=14 times the normal data rate (or 7 times or 3.5 times), which will increase CAPEX and OPEX, the main benefit of Cloud-Ran.

The following table shows some of the main DL differences between 4G LTE standards and proposed 5G standards. Both standards are based on OFDM transmission, and therefore the DL block diagram is similar:

TABLE 1

| | 4G | 5G |
|---|---|---|
| FDD, TDD | FDD, TDD | TDD only |
| Channel Bandwidth | 1.4, 3, 4, 7.5, 10 and 20 MHz | 100 MHz only |
| Subcarrier Bandwidth | $\Delta_F$ = 15 kHz | $\Delta_F$ = 75 kHz |
| RBs | 100 at 20 MHz | 100 at 100 MHz |
| Subframe Duration | 1 mSec | 0.2 mSec |
| Frame Duration | 10 mSec (=10 subframes) | 10 mSec (=50 subframes) |
| Maximum Layers | 8 | 8 |
| Analog Beamforming RS | No | Yes |
| Phase noise compensation RS | No | Yes |
| 2x2 MIMO peak throughput | ~150 Mbps | <3.75 Gbps |
| DL Modulation | QPSK, 16QAM, 64QAM | QPSK, 16QAM, 64QAM |
| FFT size | 256, 512, 1024, 2048 | 2048 only |
| Channel Coding | Turbo Encoder | LDPC Encoder |

Other proposals for 5G have been published (e.g., DL with 0.5 mSec TTI instead of 0.2 mSec, or 0.1 mSec) however, these differences will not affect the embodiments described herein, which work well for both 4G and 5G standards.

Embodiments described herein address, for example, how to select the correct bits at the encoder output such that the iFFT will have all the required symbols for a successful 71 μSec conversion. Sending the wrong bits (bits that are needed in the next symbols, but not for the current symbol) adds unnecessary traffic delay. Although the description below refers to 4G terms and parameters, this should not be seen as limiting, and the embodiments are equally applicable to, e.g., 5G terms and parameters. For instance, the 71 μSec burst length above refers to a 4G parameter, however in 5G there may be a different symbol time specification.

FIG. 1 is a schematic illustration of an example of a C-RAN architecture 1 including plural remote radio heads (RRHs) 10 each locally coupled with a remote L1 PHY processing apparatus 11 which is connected via a fronthaul interface 12 to a corresponding centralized L1 PHY processing apparatus 13.

Each of the centralized L1 PHY processing apparatuses 13 may form part of a centralized baseband processing apparatus 14. The centralized baseband (BB) processing apparatus 14 may additionally include the L2 and L3 functions 15, 16. The centralized BB processing apparatus 14 may be communicatively couple to an evolved packet core (EPC) 17. The EPC 17 is communicatively coupled to one or more external networks, such as the internet. The centralized baseband apparatuses 14 and the EPC 17 form part of a cloud 20 computing architecture.

Each of the RRHs 10 is configured to service one or more user equipment (UE) 18. In this way, the UEs 18 are able to transmit data to and receive data from the external networks 19, via the RRH 10, the remote L1 PHY processing apparatus 11, the BB processing apparatus 14 and the EPC 17. As such, each of the remote and centralized L1 PHY processing apparatuses 13, 14 and the L2 and L3 processing apparatuses 15, 16 are configured to enable both the uplink of data from the UEs 18 towards the EPC 17 and the downlink of data from the EPC 17 towards the UEs 18.

In general, the various embodiments of each of the UEs 18 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Each of the remote and centralized L1 PHY processing apparatuses 13, 14, and the L2 and L3 processing apparatuses 15, 16 include various processing stages for processing data along its path to/from the UE. This specification is primarily concerned with the L1 PHY processing stages (and to a lesser extent the L2 processing stages) and, as such, the L3 processing is not discussed in any detail herein.

Figure 2:
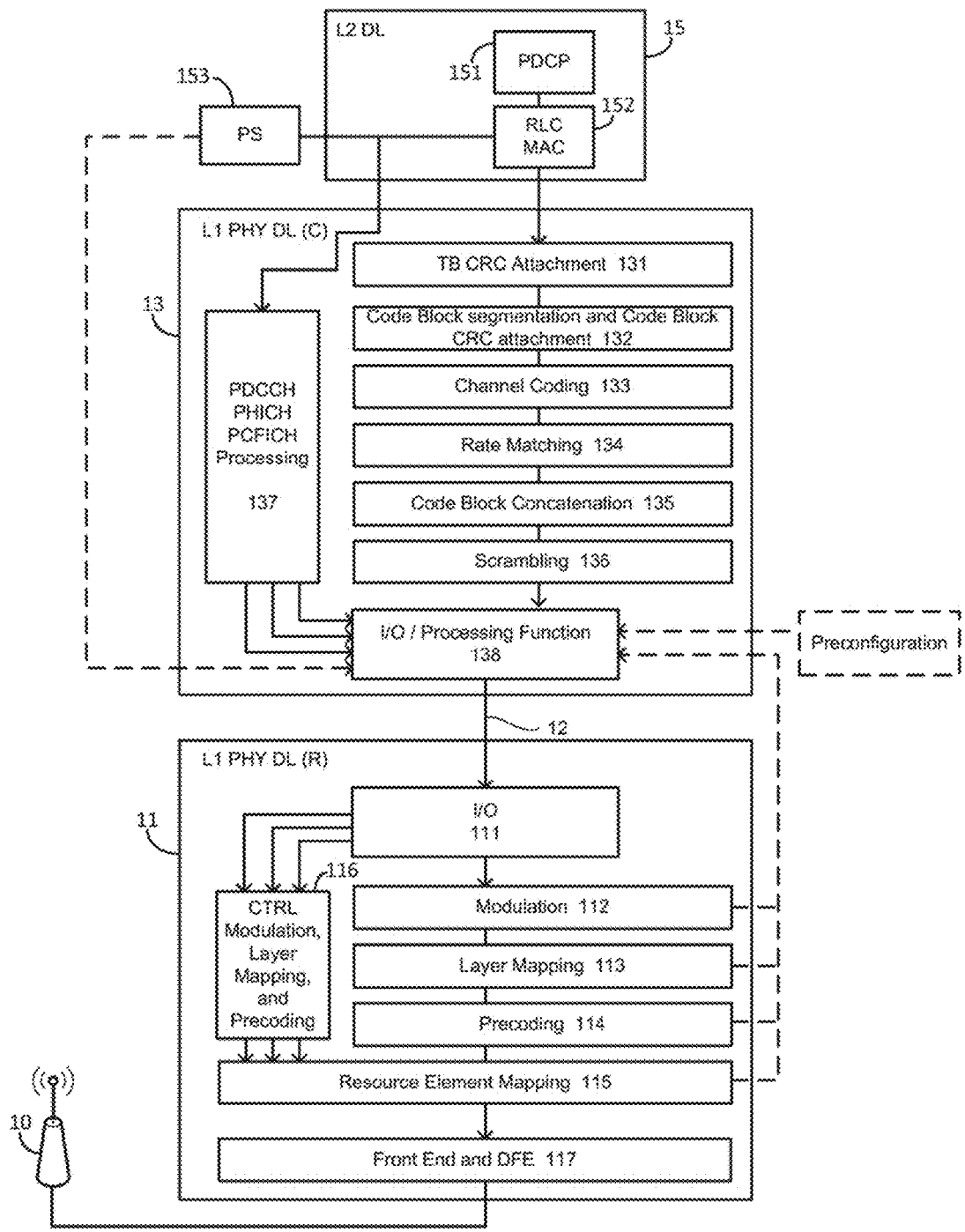
FIG. 2 is a schematic illustration of an example of a division of L1 PHY processing stages between the remote and centralized L1 PHY processing apparatuses.

FIG. 2 illustrates various L1 PHY downlink processing stages which may be employed in a 4G or 5G C-RAN base station configuration to transfer data from the L2 processing apparatus 15 in a downstream direction towards the RRH 10. The L1 PHY downlink processing stages may include control channel data processing stages 137, 116 and user plane data processing stages 131, 132, 133, 134, 135, 136, 112, 113, 114. The L1 PHY downlink processing stages may further include processing stages which process both control channel data and user plane data 138, 111, 115, 117.

The user plane data processing stages may include, in a downstream direction, a transport block CRC attachment stage 131, a code block segmentation and code block CRC attachment stage 132, a channel coding stage 133, a rate matching stage 134, a code block concatenation stage 135, a scrambling stage 136, a modulation stage 112, a layer mapping stage 113, and a precoding stage 114.

The control channel data processing stages 137, 116 may include a Physical Downlink Control Channel (PDDCH), Physical Hybrid-ARQ Indicator Channel (PHICH) Physical Control Format Indicator Channel (PCFICH) processing stage 137 and a PDDCH, PHICH, PCFICH modulation, layer mapping and precoding stage 116. Although each of these processing stages are shown as a single functional block, in reality each of the different types of control information might be processed separately (as illustrated by the three outputs from the PDDCH, PHICH, PCFICH processing stage 137). Moreover, each of the different types of processing (e.g., modulation, layer mapping and precoding) may be performed by different functional blocks.

The joint control channel data and user plane data processing stages 138, 111, 115, 117 may include a fronthaul interface output processing stage 138 configured to process data received from the upstream processing stages and to pass or transport the processed data across the split fronthaul interface 12. At the downstream end of the split fronthaul interface 12 may be a fronthaul interface input processing stage 111, which may be configured to receive the data which has been passed across the split fronthaul interface and direct it to the relevant downstream processing stages (e.g., dependent on whether it is user plane data or control channel data). Additionally, the joint control channel data and user plane data processing stages may include a resource element mapping stage 115 which receives data from the precoding stage 114 and the PDDCH, PHICH, PCFICH modulation, layer mapping and precoding stage 116. After processing, the resource element mapping stage 115 may pass the processed data to another joint control channel data and user plane data stage, the front end and digital front end (DFE) stage 117, which outputs data for transmission by the RRH 10.

FIG. 2 also shows an example of a possible division of L1 PHY processing stages between the remote and centralized L1 PHY processing apparatuses 11, 13. In this example, the division occurs between the scrambling stage 136 and the modulation stage 112. However, as will be appreciated (for instance, from the later discussion with respect to FIG. 5) the split in L1 PHY processing stages may alternatively be in a different location.

The following is an explanation as to how the user plane data may be transferred across the interface 12 on a symbol-by-symbol basis. The numbering of the various packets is taken from FIGS. 4A and 4B although, as will be appreciated, those figures depict only one possible example as to how the symbol-by-symbol data transfer may be achieved.

The fronthaul interface output processing stage 138, which forms part of the centralized L1 PHY processing apparatus 13, is configured to generate at least one first user plane data packet 401A, 401B (sometimes referenced 401) based on user plane data 300 which is output by a first L1 PHY processing stage, which in the example of FIG. 2 is the scrambling stage 138). The user plane data 300 that is output by the first L1 PHY processing stage is for transmission to one or more UE 18 and each of the at least one first user plane data packet 401 includes a proper subset of the user plane data 300 which will be transmitted from the RRH 10 to at least one of the one or more UE 18 during a first time-slot symbol (such as, but not limited to an LTE OFDM symbol).

Once generated, the at least one first user plane data packet 401 is sent to a second/recipient L1 PHY processing stage across the split fronthaul interface 12. In the example of FIG. 2, the recipient L1 PHY processing stage is the modulation stage 112. The at least one first user plane data packet 401 is sent to the fronthaul interface (from where it passes to the second/recipient L1 PHY processing stage) in a first time period (denoted Slot 1, Symbol 1 in FIG. 4A) which has a duration corresponding to a duration of transmission of the first time-slot symbol.

After sending the at least one first user plane data packet 401 in the first time period, one or more subsequent user plane data packets 402, which together include the remainder of the user plane data 300 are sent to the split fronthaul interface 12 (from where they pass to the to the second/recipient L1 PHY processing stage). At least one of the subsequent user plane data packets 402 is sent in each of one or more immediately subsequent time periods, each of which has a duration corresponding to a duration of transmission of a time-slot symbol in which the portion of user plane data included in the at least one subsequent user plane data packet 402 is to be transmitted by the RRH to the at least one of the UEs 18.

The time periods in which the first user plane data packet(s) 401 and the one or more subsequent user plane data packets 402 are sent across the interface may be successive and may follow directly one from another such that there are no intervals between successive time periods. In addition, the amount of user plane data carried by the combination of the one or more user plane data packets sent in each time period may be substantially the same. Consequently, the data that is sent across the split fronthaul interface may be considered as a data stream having a near-constant bandwidth. Moreover, as the user plane data sent across the interface 12 (in one or more user plane data packets 401, 402) in each time period is to be transmitted to the UE 18 in a separate time-slot symbol, the transfer of user plane data across the split fronthaul interface 12 could be said to be on a symbol-by-symbol basis.

The recipient L1 PHY processing stage at the remote L1 PHY processing apparatus 11 (which, in the example of FIG. 2 is the modulation stage 112) receives the first user plane data packet(s) 401 and the one or more subsequent user plane data packets 402 from the split fronthaul interface (via the fronthaul interface input stage 111), in respective successive time periods corresponding to the time periods in the which the user plane data packets were sent across the interface 12.

The recipient L1 PHY processing stage is configured to begin processing the first user plane data packet(s) 401 (which is received in a first time period), prior to the expiry of the subsequent time period, in which at least one subsequent user plane data packet 402 is received. Similarly, the recipient L1 PHY processing stage begins to process the subsequent user plane data packet(s) 402 prior to expiry of the next time period (in which the next at least one subsequent user plane data packet is received). The user plane data packets 401, 402 are thus processed as a data stream.

After processing by recipient L1 PHY processing stage, the processed data packet(s) received in the first/subsequent time periods are passed to the next L1 PHY processing stage (in the example of FIG. 2, the layer mapping stage 113).

In legacy systems, which employ "burst" (or high bandwidth, low time) transfer of data between L1 PHY processing stages (for instance, as illustrated and discussed with reference to FIGS. 3A and 3B), the L1 PHY processing stages prior to the resource mapping processing stage 115 process user plane data on a block by block basis as it is received at the respective processing stage. However, by processing and passing the user plane data across the fronthaul interface 12 on a symbol-by-symbol basis (i.e., such that 1 TTI-worth of data is transferred over approximately 1 TTI of time) various benefits may be achieved. For instance, the bandwidth requirements on the fronthaul interface may be relaxed because the user plane data is no longer being transferred as bursts but is instead being performed in lock step with the over-the-air transmission from the RRH 10. In addition, by transferring user plane data on a symbol-by-symbol basis, data may be transferred across the fronthaul interface 12 at a roughly constant rate (when compared to legacy systems). This allows the recipient L1 PHY processing stage to process the user plane data in a more uniform and predictable way. It may be beneficial to increase the uniformity and predictability of workload as it may allow a reduction in the extent to which the target hardware architecture is required to be over-dimensioned in order to consume a given workload in an allotted time period. For example, in a "burst-type" (high bandwidth, low time) scheme, the hardware might be dimensioned to consume the entire workload in a duration that is reduced by the transport time of the data (i.e., no overlap between transmission time and processing time). As such, the hardware capacity is effectively inflated due to the loss of processing time opportunity while waiting for data. However, by spreading the workload more uniformly, the hardware may be dimensioned to perform processing almost entirely overlapped with the reception of new data (see, for instance, FIG. 4B). This may effectively give the hardware additional time to consume the overall workload. Another potential benefit is that, because the fronthaul interface 12 may typically be a packetized interface (for instance, but not limited to an Ethernet interface), the interface prefers a uniform and predictable workload instead of burst-type workload. Indeed, burst-type workloads often result in queueing delay at the packetized interface, while uniform & predictable load may reduce occurrences of such delays.

It should also be noted that the transfer of data on a symbol-by-symbol basis may not detract from the available end-to-end pipeline processing time within a HARQ loop (which is approximately 3 ms for 4G). Whereas, if the bursts of data in legacy systems were to be transferred with a lower bandwidth, this additional transfer time would detract from the available end-to-end pipeline processing time with the HARQ loop.

In order to enable the second/recipient L1 PHY processing stage to process the received user plane data on a symbol-by-symbol basis, control information may be passed across the split fronthaul interface at the latest during the first time period (during which the first user plane data packet(s) 401 is transferred). This control information, which may be referred to as service access point (SAP) control information enables the recipient L1 PHY processing stage to begin processing the received first user plane data packet(s) 401 prior to receipt of the one or more subsequent user plane data packets 402. This SAP control information may be received at the fronthaul interface output processing stage 138 directly from the packet scheduler 153, or indirectly via the L2 processing apparatus 14.

In some examples, the SAP control information is passed across the fronthaul interface 12 as a control information packet 400 prior to the first time period (in which the first user plane data packet(s) is sent). Alternatively, the SAP control information may be included in the first user plane data packet(s) 401 with the proper subset of the user plane data. The SAP control information, whether provided in the first user plane data packet 401 or prior to the first time period in a separate control information packet 400, is sufficient to enable the recipient L1 PHY processing stage to process the both the first user plane data packet 401 and the one or more subsequent user plane data packets 402. In such examples, the subsequent user plane data packets 402 may each include information which enables the recipient L1 PHY processing stage 112 to identify a portion of the SAP control information which relates to the particular user plane data packet. Similarly, the first user plane data packet 401 may also include such information. This information may, for instance, identify the UE for which the user plane data carried in the user plane data packet is intended.

In examples in which the SAP control information is passed across the fronthaul interface 12 as the separate control information packet 400, the control information packet 400 may be passed to the fronthaul interface 12 in a time period that is prior to the first time period (in which the first user plane data packet(s) is sent) along with another control information packet 405 which includes L2 packet scheduler downlink control information (e.g., PDCCH, PCFICH, PHICH etc.). The time period during which the control information packets 400, 405 are transferred to the interface 12 may be the time period immediately preceding the first time period (in which the first user plane data packet(s) is sent) and may have a duration corresponding to the duration of transmission of a time-slot symbol. This preceding time period is denoted Slot 0, Symbol 0 in FIG. 4A.

In other examples, a control information packet 400 including the SAP control information may not be transferred prior to the transfer of the first and subsequent user plane data packets 401, 402. Instead, each of the first and one or more subsequent user plane packets 401, 402 may include a portion of SAP control information for enabling the recipient L1 PHY processing stage to begin processing the respective packet 401, 402 prior to receipt of a subsequent user plane data packet in the subsequent time period.

The SAP control information, which may be received from the packet scheduler 153, may include all or any combination of one or more of:

information indicative of the number of user equipments, UEs, allocated to a transmission time interval, TTI (also referred to as a subframe), during which the time-slot symbols carrying the user plane data are to be transmitted to a UE;

information indicative of the modulation and coding scheme allocated for each of the UEs allocated to the TTI;

information indicative of the multiple-input-multiple output, MIMO, scheme or the transmission diversity scheme employed for transmission of the time-slot symbols in which the user plane data is to be transmitted;

information indicative of resource block allocation for each UE;

information indicative of beamforming specific parameters employed for transmission of the time-slot symbols in which the user plane data is to be transmitted; and information indicative of a number of symbols that are reserved for a physical downlink control channel, PDCCH (e.g., the PDCCH control frame indicator (CFI)).

In addition to being passed across the fronthaul interface 12, the information received from the packet scheduler 153 may additionally be utilized by the fronthaul interface output processing stage 138 to divide the user plane data received from the first L1 PHY processing stage (in the example of FIG. 2, the scrambling stage) thereby to generating the first and subsequent user plane data packets 401, 402. Generation of the first and subsequent user plane data packets 401, 402 may comprise selecting, based on the information received from, for instance, the packet scheduler a proper subset of the bits of the user plane data and encapsulating these bits thereby to form the packet. As is discussed in more detail below, the generation of the packets may include provision of reference data, for instance identifying the user equipment for which the user plane data is intended, a slot identifier, a symbol identifier and a sub frame identifier.

The fronthaul interface output processing stage 138 may also receive pre-configuration information and "a priori" information relating to processing to be performed by one or more L1 PHY processing stages downstream from the first L1 PHY processing stage. This received information may be additionally be used to generate the first and subsequent user plane data packets 401, 402.

The pre-configuration information may be received, for instance, from the system boot-up or from a man machine interface (MMI). It may include, for instance, all or any combination of one or more of the following:

information indicative of channel bandwidth which is to be utilized for transmission of the time slot-symbols in which the user plane data is carried;

information indicative of the duplexing scheme, such as time division duplexing or frequency division duplexing, which is to be utilized for transmission of the time slot-symbols in which the user plane data is carried;

information indicative of transport block size which is to be utilized for transmission of the time slot-symbols in which the user plane data is carried; and information indicative of cooperative features which are to be utilized for transmission of the time slot-symbols in which the user plane data is carried (such cooperative features may include, but are not limited to, carrier aggregation and coordinated multipoint).

The "a priori" information relating to processing to be performed by the one or more processing stages downstream from the first L1 PHY processing stage may, for instance, be received from those downstream processing stages beyond the fronthaul interface. It may be generated by centralized L1 PHY apparatus 13 based on information received from the packet scheduler. The "a priori" information may include all or any combination one or more of:

information indicative of the modulation scheme to be utilized for converting the transferred user plane data packets into corresponding modulation symbols (for instance, for 4G, it may identify one of QPSK, 16 QAM, 64 QAM, 256 QAM; for 5G, it may identify a different modulation scheme);

information indicative of the scheme to be utilized for assigning the modulation symbols to one or more layers, which may depend on the specific transmission scheme being used;

information indicative of the scheme to be utilized for applying precoding to the modulation symbols in each layer and for mapping the pre-coded symbols to appropriate antenna ports; and information indicative of the scheme to be utilized for assigning the modulation symbols of the resource grid to be transmitted on each antenna port to specific resource elements (e.g., information on the specific subcarriers and symbols within the resource blocks).

As discussed previously, the recipient L1 PHY processing stage (which, in the example of FIG. 2, is the modulation stage 112) is configured such that it can perform its processing on a symbol-by-symbol basis. This is a re-engineering of the corresponding processing stage in legacy systems. In order to achieve this, the recipient L1 PHY processing stage may be provided with "a priori" knowledge of the physical resource block mapping which is to be utilized by the resource element mapping stage 115. Similarly to as discussed above, this a priori knowledge may be generated based on information received directly or indirectly from the packet scheduler 153.

Figure 3A:
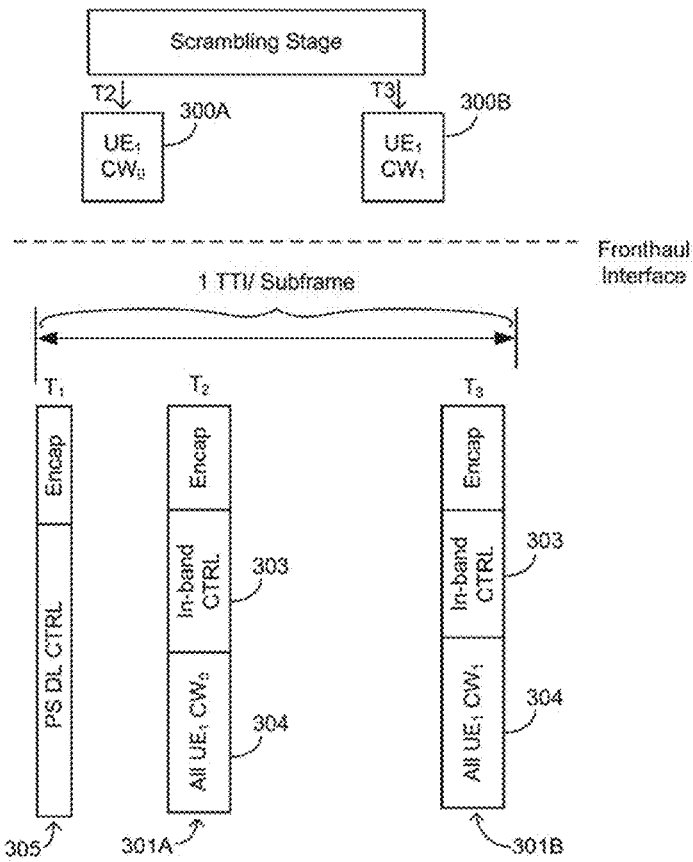
FIGS. 3A and 3B are schematic illustrations of packets passed downstream across a fronthaul interface according to a legacy "burst" method.
Figure 3B:
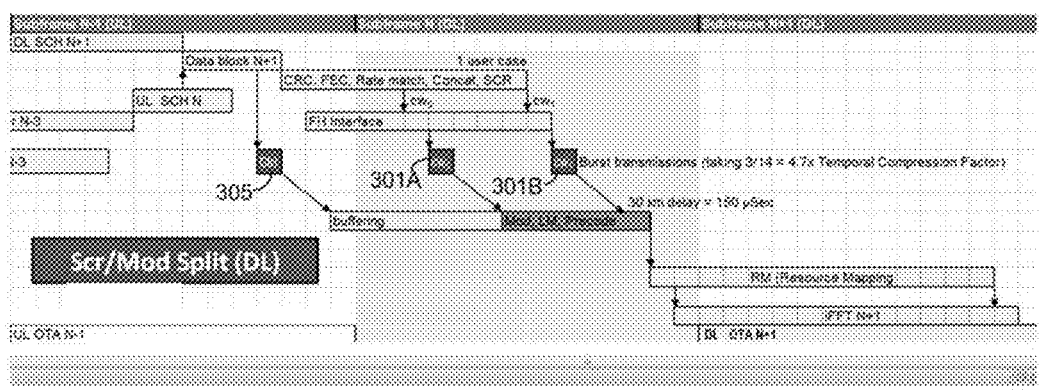

FIGS. 3A and 3B are schematic illustrations of packets being passed downstream across a fronthaul interface according to legacy methods. In this example, the split in the fronthaul interface is located in between the scrambling stage and the modulation stage.

As illustrated in FIG. 3A, one or more codewords 300A, 300B are output by the scrambling stage (for simplicity, only codewords relating to a particular UE (UE1) are shown). These codewords include user plane data for transmission by the RRH to the particular UE. The scrambling stage may output maximum of two codewords per UE per TTI. In the legacy method, each codeword 300A, 300B is passed across the fronthaul interface 12 as one or more packets. In this example, each packet 301A, 301B includes all the bits of a respective codeword. However, in some instances, the codewords 300A, 300B may be fragmented into multiple packets for transfer across the interface, depending in their size.

In the legacy method, each packet 301A, 301B that is transferred across the interface 12 includes in-band control information 303, which is required by at least the recipient L1 PHY processing stage (in this example, the modulation stage) in order to process the received packets. Downlink packet scheduler control information, which carries data for transmission on the dedicated control channels is passed across the interface as separate control information packet 305 (one or more such packets may be transferred per TTI).

FIG. 3B shows an example data processing/transfer timing diagram according to the legacy data transfer approach.

As can be seen in FIG. 3B, a data transport block for a single user undergoes CRC/segmentation, FEC, rate matching, concatenation, and scrambling. Each scrambled codeword 305 is then packetized and passed over the fronthaul interface as soon as it is output by the scrambling stage. After modulation, the user plane data undergoes layer mapping, precoding, resource mapping, iFFT and finally downlink over the air transmission.

A separate control information packet 305 carrying the out-of-band control information carrying the downlink packet scheduler control information is passed across the interface as soon as it is generated and is buffered until the one or more packets 301 carrying the first codeword of user plane data are burst transferred across the interface. Once the data from the first codeword has been received by the modulation stage, modulation can begin.

Figure 4A:
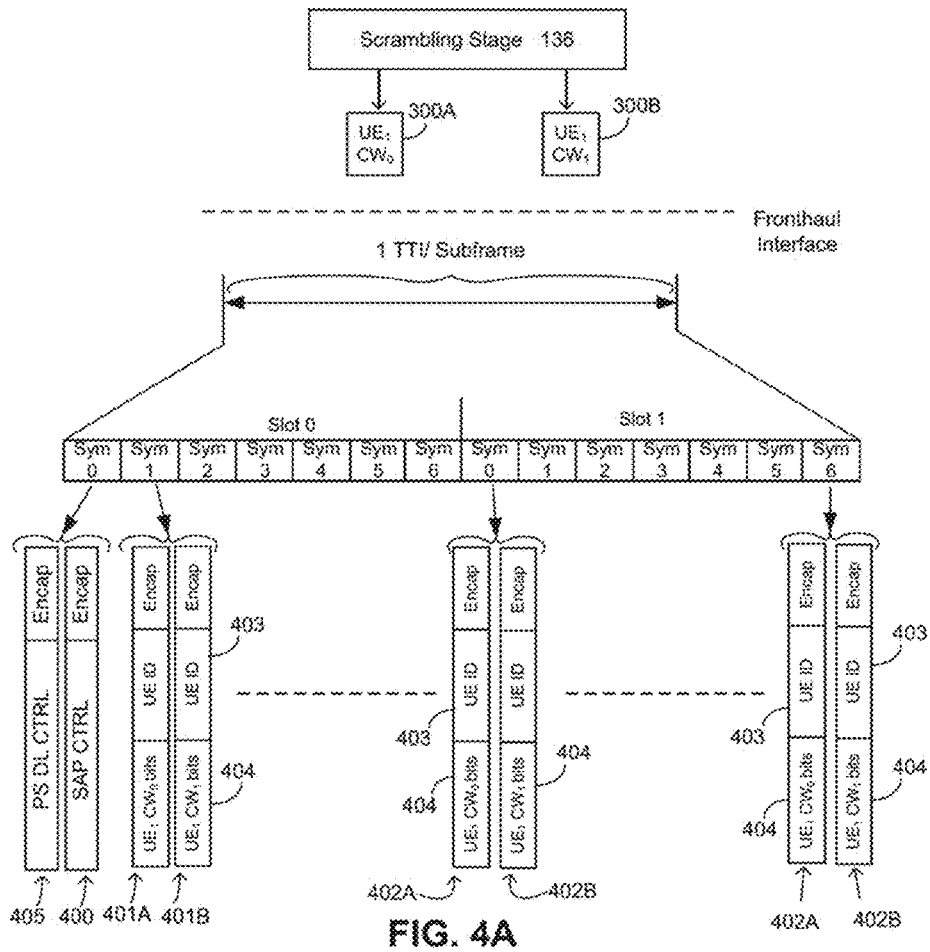
FIGS. 4A and 4B are schematic illustrations of the transfer of user plane data across the split fronthaul interface from the centralized L1 PHY processing apparatus to the remote L1 PHY processing apparatus on a "symbol-by-symbol" basis.
Figure 4B:
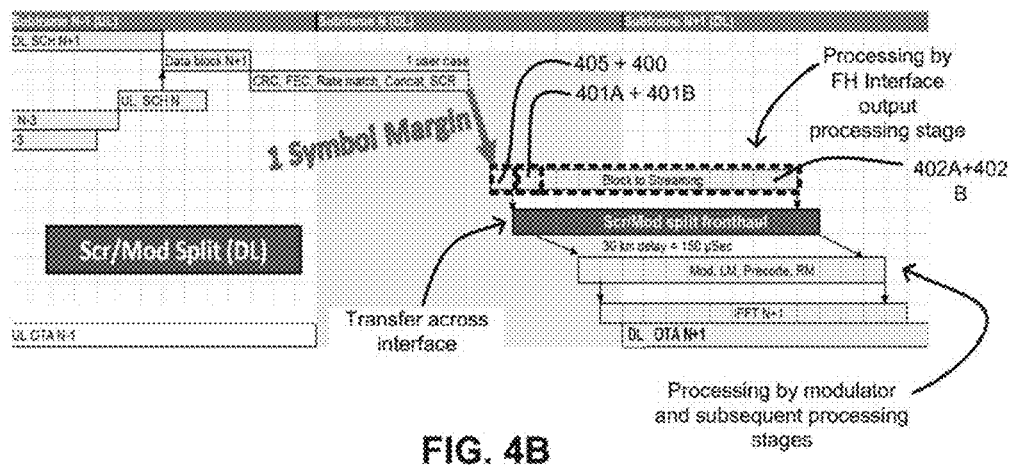

The legacy data transfer approach exemplified in FIGS. 3A and 3B can be compared with the symbol-by-symbol data transfer process described in general terms, a specific example of which is illustrated in FIGS. 4A and 4B.

In the example of FIGS. 4A and 4B, the division between the remote and centralized L1 PHY processing apparatus (i.e., the location of the fronthaul interface 12) is the same as that illustrated in FIG. 2. Again, for simplicity, FIGS. 4A and 4B both show only user plane data which is to be transmitted to a single UE.

As illustrated in FIG. 4A, the fronthaul interface output processing stage 138 receives from the scrambling stage 132 one or more packets 300A, 300B containing user plane data for transmission to a single UE. As can be seen from FIG. 4B, instead of transferring the codewords across the interface in their entirety (or in fragmented packets, if necessitated by the codeword size) as soon as they are output by the scrambling stage (as is the case in the legacy system), the fronthaul interface output processing stage 138 waits to receive all codewords carrying user plane data which is to be transmitted in a particular TTI/subframe. After all codewords 300A, 300B (again, the maximum may be two per UE per TTI) have been output by the scrambling stage 136, the fronthaul interface output processing stage 138 begins processing the codewords and generating packets 401, 402 for transfer across the fronthaul interface 12 on a symbol-symbol basis. In particular, the fronthaul interface output processing stage 138 generates one or more user plane data plane packets 401, 402 for transfer across the fronthaul interface 12 in each of plural different successive time periods (for simplicity of the FIG. 4A, only 3 pairs of user plane data plane packets are shown). Each of the successive time periods (denoted Slot 1/2, Symbol 1, 2, 3 etc., in FIG. 4A) has a duration corresponding to the duration of a transmission time of a time-slot symbol (in which user plane data carried in the packet(s) is to be transmitted to the UE).

As will be appreciated from the above discussion, the order of the time periods in which the packets are transferred across the interface corresponds to the order in which the time-slot symbols including data from the packets are to be transmitted to UE.

In the example of FIG. 4A, a pair of "first user plane data plane packets" 401A, 401B is transferred across the fronthaul interface 12 in the first time period (denoted Slot 0, Sym 1). In this example, each packet 401A, 401B of the pair contains a subset of the bits of user plane data from a different codeword.

Subsequently, pairs of subsequent user plane data plane packets 402A, 402A are transferred across the interface each in each of successive subsequent time periods (e.g., those denoted by Slot 0, Sym 2, 3, 4 etc.). Although only two pairs of subsequent user plane data plane packets 402A, 402B are shown in FIG. 4A, it is clear from FIG. 4B that subsequent data plane packets are transferred in each of a successive sequence of time periods. As with the pairs of first user plane data plane packets 401, in the Example of FIG. 4A, each packet of the pairs of subsequent user plane data plane packets 402 includes subsets of the bits of user plane data from a different codeword.

Typically, the subset of user plane data carried in a first/subsequent user plane data packet 401 may be for transmission to only a single UE. However, in some instances, user plane data for multiple users (e.g., multiple, or even all, of the code blocks for different users shown in the column marked slot 0, symbol 1 in FIG. 6) may be aggregated into a single packet. Such aggregation of user plane data for multiple users may occur, for instance but not exclusively, when the data is to be transmitted to an intermediary device, which will then distribute the user plane data to separate UEs (for instance, a UE integrated with a vehicle may distribute data to separate UEs travelling within the vehicle). Similarly, each of at least two first/subsequent user plane data packets 401A, 401B, 402A, 402B transferred across the interface in a particular time period may carry user plane data intended for transmission to different end user equipments.

The example illustrated in FIGS. 4A and 4B is one in which the SAP control information is sent across the fronthaul interface 12 in a control information packet 400 in a time period (denoted Slot 0, Sym 1) prior to that in which the first user plane data packet 401 is passed across the interface. Consequently, in this example, each of the user plane data packets includes information 403 (referred to as UE ID) which identifies the SAP control information which relates to the user plane data packet. In the example of FIG. 4A, the control information packet 400 is transferred across the interface in a time period with the control information packet 405 which carries dedicated control channel data.

As can be seen from FIG. 4B, by transferring the user plane data across the interface on a symbol-by-symbol basis an extra symbol margin for the end-to-end latency may be provided (in comparison to the legacy case illustrated in FIG. 3B). This, coupled with the lowered bandwidth requirement on the fronthaul interface 12 may serve to provide a more efficient mode of fronthaul transport.

Figure 5:
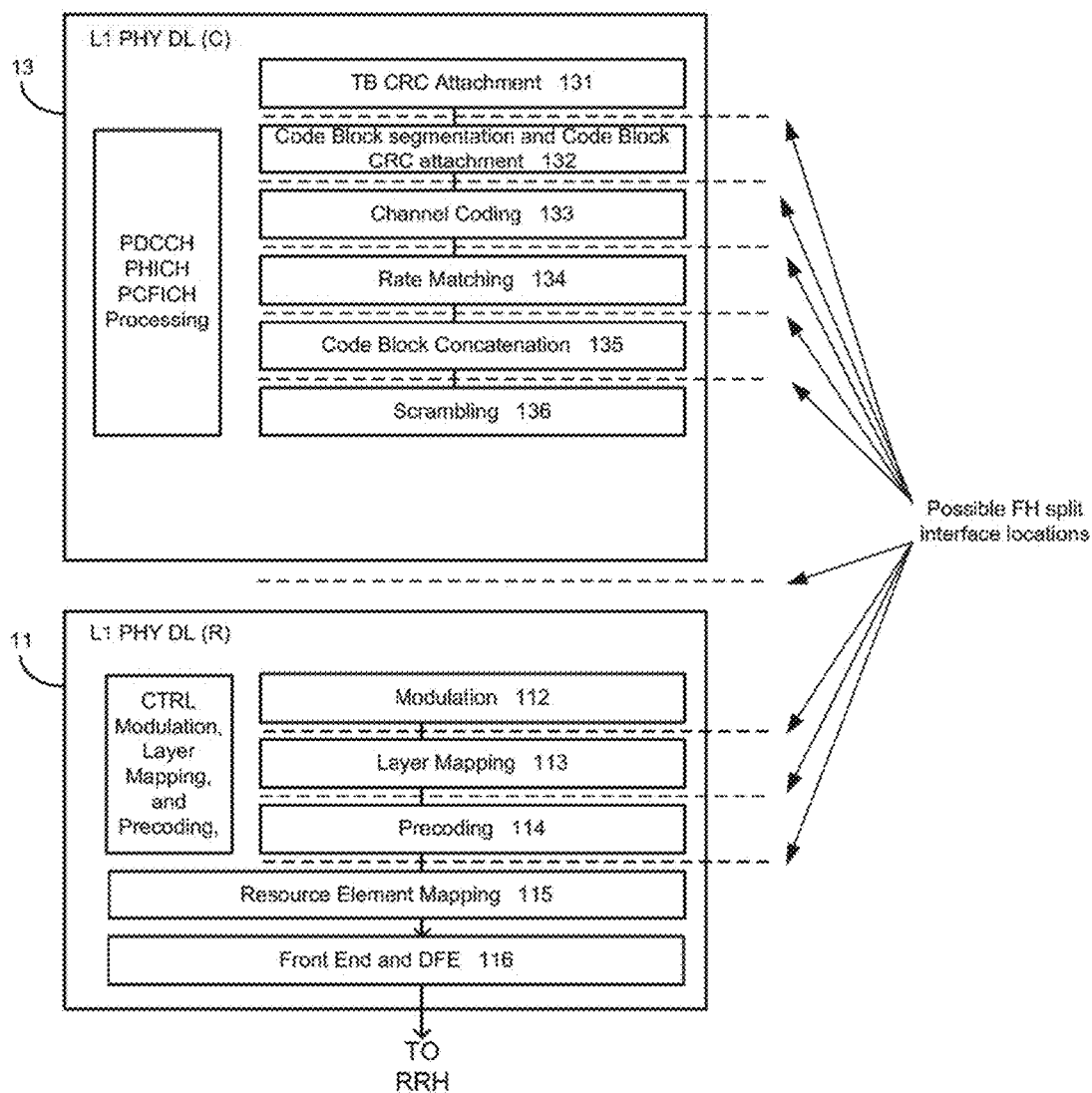
FIG. 5 illustrates various other examples of divisions of L1 PHY processing stages between the remote and centralized L1 PHY processing apparatuses.
Figure 6:
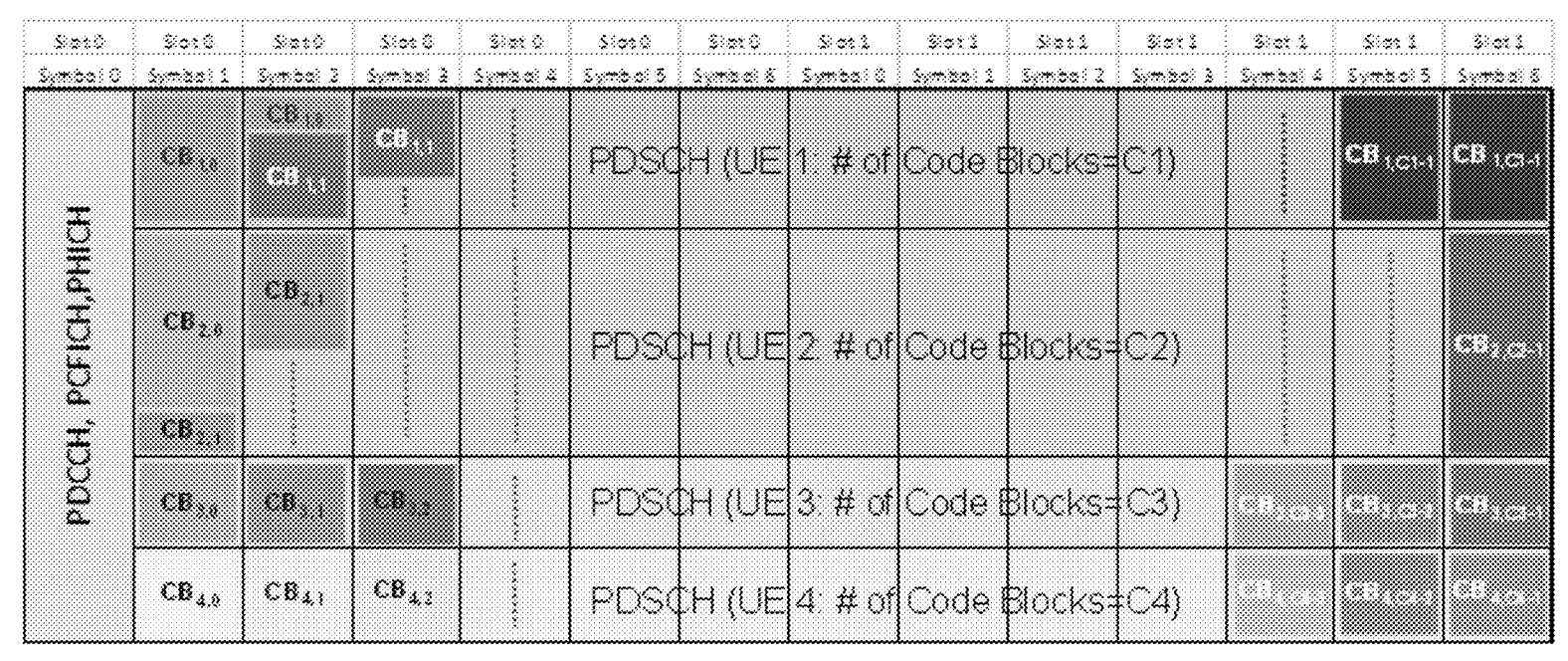

As mentioned previously, the symbol-by-symbol transfer of data is not limited to a fronthaul interface located between the scrambling and modulation stages (as shown in FIG. 2). Instead, it may equally be applied when the interface is at other locations. FIG. 5 shows the various locations at which the fronthaul interface may be provided and with which symbol-by-symbol data transfer may be utilized. Indeed, as illustrated in FIG. 6, it may occur between any of the L1 PHY processing stages.

The implementation of the interface between the scrambling stage and modulation stage (as in FIG. 2) or any subsequent downstream location (e.g., for instance between the layer mapping stage and the precoding stage) may be relatively straightforward. This is because the functional processing by the processing stages surrounding the interface is based on a small number of bits at a time, with the number of bits being substantially less than the number of bits in a time slot symbol. In addition, each processing operation on each bit or group of bits is "independent" of the processing performed on earlier or later bits or groups of bits. For instance, the functional processing performed by the scrambling stage is on a single bit level, with the processing by downstream stages increasing to modulated symbol level (for processing performed by the modulation processing stage) and to 8×modulated symbol level basis (for the layer mapping). In both of these cases (modulation and layer mapping), each modulated symbol is independent.

Because the processing performed by these downstream processing stages is independent of earlier or later processing, there is no processing inefficiency resulting from non-uniform processing from one symbol to the next. The processing rate is, therefore, is largely uniform. In addition, there is no granularity issue with regard to the transport; it is possible send exactly (or nearly) the number of bits needed for downstream processing of a time-slot symbol.

The processing prior to the modulation stage is all "bit level" processing. However, for some processing prior to the modulation stage, the bits are not independent of one another. For instance, in the encoder, the processing is clearly not bit-level independent. Instead, bits are interdependent because that is the nature of "coding".

The channel coding stage 133 provides a "code block" of data, which might be a significant part of the data carried by a time-slot symbol or perhaps, in some instances, a little more than a time-slot symbol. In view of this, in some examples in which the interface 12 is located immediately after the channel coding stage 133, the channel coding stage 133 may be caused to stop generation of a code block after the bits required for a particular time-slot symbol have been generated. However, in view of the "time zero" nature of the channel coding stage 133, the states in the channel coding stage may be saved so that it can be restarted for generation of the subsequent bits.

Alternatively, the channel coding stage 133 may be caused to temporarily stop encoding at code block boundaries (in view of the fact that multiple code blocks are concatenated to make a codeword). A portion of the code block will be transmitted as a first time-slot symbol may then be transferred across the interface 12, with the remaining data in the generated code blocks being saved for subsequent transfer across the interface.

FIG. 6 illustrates an example of the mapping of coded bits to time-slot symbol time periods. As can be seen, code block $CB_{1,0}$ is an example of a code block which is larger than can be contained in a single time-slot symbol's worth of time. Code blocks $CB_{3,0}$ and $CB_{4,0}$ on the other hand are contained fully within a time-slot symbol duration.

Both of these methods (stopping at the code block boundary or temporarily stopping the channel coding stage) provide efficient transfer of data across the fronthaul interface, but may result in more variation or complexity in the functional processing by the channel coding stage. That is, processing will not be uniform or constant from one time-slot symbol to the next. For 5G, however, this processing variation efficiency may be eliminated. This is because low-density parity-check coding (as opposed to the 4G-based turbo encoding), which may be used in 5G is more efficient and uses smaller code blocks than does the turbo encoding of 4G. Because latency is a key concern with regard to 5G, code blocks could be sized in a manner that exactly aligns to time-slot symbol boundaries on a user by user basis. Put another way, each code block may include an amount of user plane data that is less than or equal to an amount of data that can be carried in a payload of a packet transmitted as a single time-slot symbol. In this manner, both transport and processing efficiency (minimized symbol by symbol variation) may be achieved.

Figures 7A, 7B:
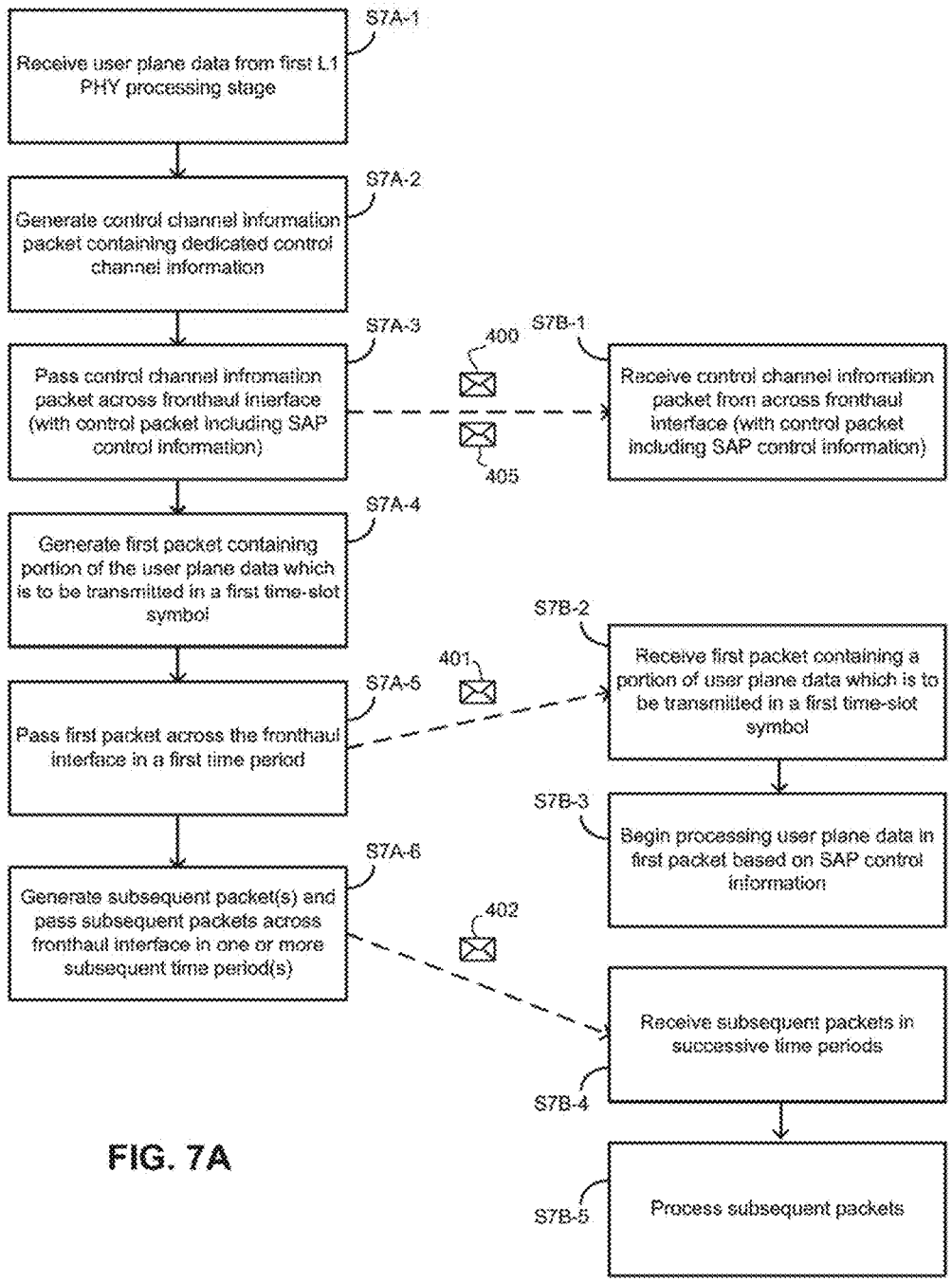
FIGS. 7A and 7B are flow charts illustrating various operations which may be performed at the centralized L1 PHY processing apparatus and the remote L1 PHY apparatus respectively.

FIGS. 7A and 7B are flow charts illustrating various operations which may be performed by the centralized and remote L1 PHY processing apparatuses 11, 13. In particular, the FIG. 7A shows operations which may be performed by the centralized L1 PHY processing apparatuses 13, in particular the fronthaul interface output processing stage 138. FIG. 7B shows operations which may be performed by the L1 PHY processing stage which is immediately downstream of the fronthaul interface 12 (which, in the example of FIG. 2 is the modulation stage 112).

In operation S7A-1 of FIG. 7A, the fronthaul interface output processing stage 138 receives user plane data 300A, 300B (generally referenced 300) which is output from a first L1 PHY processing stage (i.e., the stage which immediately precedes the fronthaul interface output processing stage 138) and which is for transmission within a single transmission time interval. The format of the user plane data 300 depends on the nature of the first L1 PHY processing stage. For instance, if the first L1 PHY processing stage is the scrambling stage (as is the case in FIG. 2), the user plane data 300 may be in the form of one or more codewords.

In operation S7A-2, the fronthaul interface outpuRt processing stage 138 generates a control channel information packet containing dedicated control channel information which is to be transmitted to UEs being served by the eNB 7 on one or more dedicated control channels (e.g., PDCCH, PHICH, PCFICH).

In operation S7A-3, the control channel information packet 405 is sent across the fronthaul interface 12 in an initial time period having a duration corresponding to a duration of transmission of a time-slot symbol (e.g., slot 0, sym 0) in which the dedicated control information is to be transmitted to the UEs.

In some examples, the control channel information packet 405 is transferred across the split fronthaul interface in the same time period as a SAP control information packet 400. The SAP control information packet 400 may contain control information for enabling the L1 PHY processing stages on the remote side of the fronthaul interface 12 to continue processing the transferred data on a symbol-by-symbol basis. The SAP control information packet 400 may have been generated by the fronthaul interface output processing stage 138 on the basis of information received from the packet scheduler 153.

In operation S7A-4, the fronthaul interface output processing stage 138 generates a first user plane data packet 401 including a portion of the received user plane data that is to be transmitted to a particular UE during a first time-slot symbol (e.g., slot 0, sym 1). In some examples, two or more first user plane data packets 401A, 401B may be generated. Each packet of the two or more packets may 401A, 401B may, for instance, include data bits derived from different codewords output by the scrambling stage 136.

In operation S7A-5, the first user plane data packet 401 (or pair of packets 401A, 401B) is sent to the remote L1 PHY processing apparatus 11 via the split fronthaul interface during a time period having a duration corresponding to a duration of transmission of a time-slot symbol. The time period in which the first user plane data packet(s) 401 is/are sent to the remote L1 PHY processing apparatus 11 may be immediately subsequent to the initial time period during which the control channel information packet 405 (and, in some examples, also the SAP control information packet 40) is sent to the remote L1 PHY processing apparatus 11.

In some examples, the first user plane data packet(s) 401 may also include SAP control information for enabling the remote L1 PHY processing stages to process at least the user plane data included in the first user plane data packet(s). In other examples in which the SAP control information is sent as a separate packet 405 (i.e., out of band with the user plane data) the first user plane data packet(s) 401 may include information 403 which indicates the portion of the SAP control information which should be used for processing the user plane data included in the user plane data packet(s). This information may include, for instance (see FIG. 8B), a UE identifier, a symbol ID, a slot ID and a codeword ID.

In operation S7A-6, the fronthaul interface output processing stage 138 generates one or more subsequent user plane data packets from the received user plane data. These packets are then sent to the remote L1 PHY processing apparatus 11 during one or more subsequent and successive time periods. The one or more subsequent user plane data packets may be generated based on the same information to that used for generation of the first user plane data packet(s). As with the time periods in which control channel packet 400 and the first user plane data packet(s) 401 are sent, the time periods in which the subsequent user plane data packets 402 are sent across the interface have a duration corresponding to a duration transmission of the time-slot symbols via which the user plane data of those packets will be sent to the UE. In some examples, for instance when the user plane data arrives in two separate codewords, a pair of subsequent packets 402A, 402B may be sent to the remote L1 PHY processing apparatus 11 during a single subsequent time period.

Referring now to FIG. 7B, in operation S7B-1, the initial L1 PHY processing stage in the remote L1 PHY processing apparatus may receive the control channel information packet 405 from the centralized L1 PHY processing apparatus 13 via the fronthaul interface. The control channel information packet 405 is received in time period which corresponds to transmission time of a time-slot symbol in which the control channel information carried in the control channel information packet 405 is to be transmitted. In some examples, the SAP control information packet 400 may be received in the same time period as the control channel information packet 405.

As will be appreciated, due to the distance between the centralized L1 PHY processing apparatus and the remote L1 PHY apparatus 11, there is a delay between the packets being transferred from the centralized L1 PHY processing apparatus 13 and being received at the remote L1 PHY processing apparatus 11. For instance, as illustrated in FIG. 4B, if the distance between the remote and centralized L1 PHY apparatuses 11, 13 is 30 km, the time delay may be approximately 150 microseconds (which may be equivalent to duration of three time-slot symbols).

Subsequently, in operation S7B-2, the first user plane data packet 401 (or pair of first user plane data packets) is received via the fronthaul interface. This packet is received in a time period that corresponds to transmission time of a time-slot symbol in which the portion of the user plane data carried in the first user plane data packet(s) 401 is to be transmitted. In some examples, the time period in which the first user plane data packet(s) 401 is received may be immediately subsequent to that in which the control channel information packet 405 (and in some instances also the SAP control information packet 400) is received.

Following receipt of the first user plane data packet(s) 401, the initial L1 PHY processing stage in the remote L1 PHY processing apparatus, in operation S7B-3 begins processing the user plane data in the first user plane data packet(s). The processing is performed using the SAP control information for that packet (which is either transferred prior to the first user plane data packet(s) 401 or forms part of the first user plane data packet(s).

Once processed, the processed user plane data is passed to the subsequent L1 PHY processing stage, which in the example of FIG. 2 is the layer mapping stage 113.

In operation S7B-4, the one or more subsequent user plane data packets 402 are received via the fronthaul interface. These may be received in successive time periods which are immediately subsequent to the time period in which the first data packet(s) are received. As mentioned above, in some examples, a pair of subsequent packets may be received in each time period. Also, each subsequent time period may have a duration corresponding to a duration in which a time slot symbol carrying the user plane data (received during the subsequent time period) will be transmitted.

In operation S7B-5, the subsequent user plane data packets received in each subsequent time period are processed by the initial L1 PHY processing stage in the remote L1 PHY processing apparatus 11. The processing of each packet (or pair of packets) may be performed as the next subsequent packet (or pair of packets) is being received. Again, the processing may be based on the SAP control information. Once processed, the processed user plane data is passed to the subsequent L1 PHY processing stage (which in the example of FIG. 2 is the layer mapping stage 113).

Figure 8A:
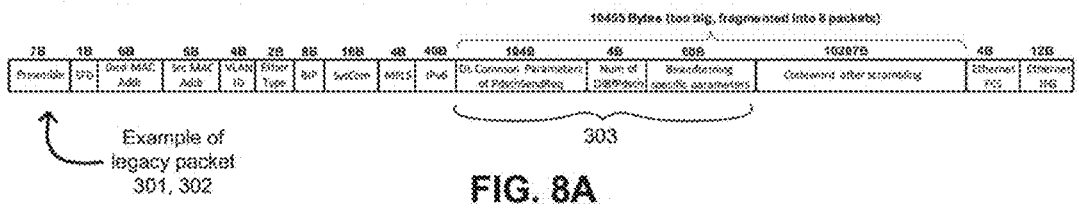
FIGS. 8A to 8C illustrate the substantially constant fronthaul interface data transfer rate that may be achieved by transferring user plane data on a symbol-by-symbol basis.
Figure 8B:
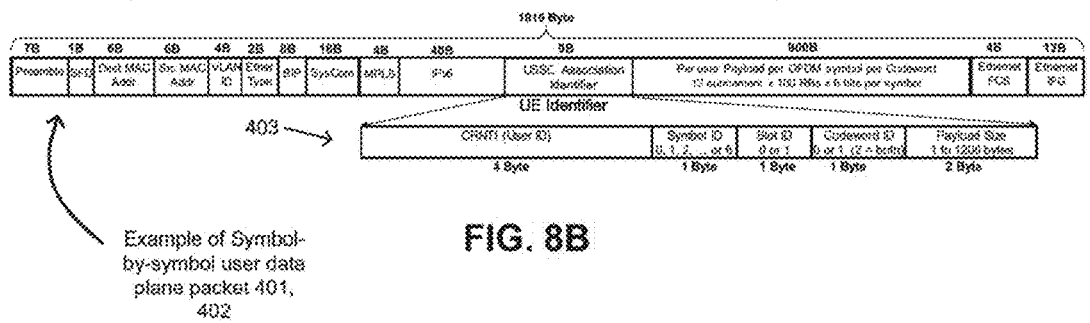
Figure 8C:
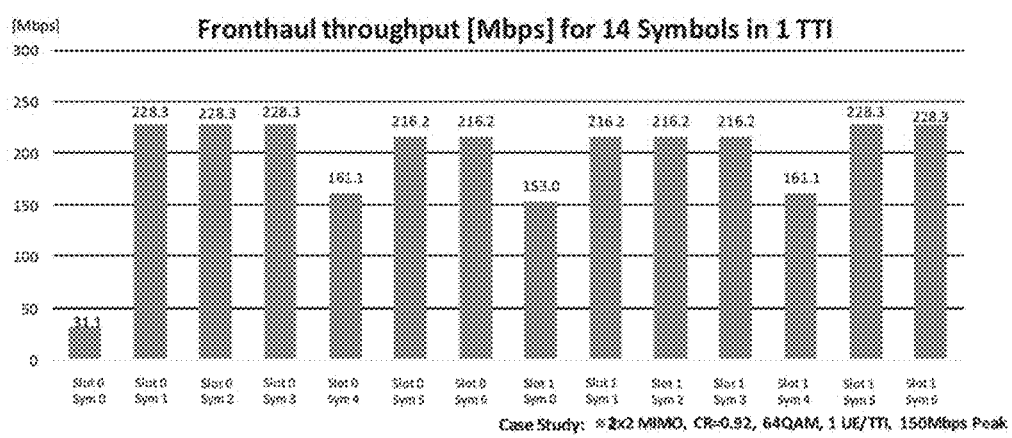

FIGS. 8A to 8C will now be used to explain quantitatively various benefits which may be obtained by employing a symbol-by-symbol transfer of user plane data across the fronthaul interface such as described with reference to FIGS. 1, 2, 4A, 4B, 7A and 7B.

FIG. 8A illustrates an example composition of a burst containing user plane data for a single user which may be transferred across the fronthaul interface using the legacy burst method, for instance as illustrated in FIGS. 3A and 3B. In particular, FIG. 8A illustrates the packet composition in an example system with the following operating parameters: 2×2 MIMO, High Code Rate (CR=0.92), 64 QAM single UE per TTI.

In the example of FIG. 8A, the scrambled codeword size is 10287 bytes, which results in a fronthaul throughput of 11335 bytes or 90680 bits (10455 Bytes+8 encapsulation overhead (=110 bytes)). If this is transmitted during a duration equivalent to one time-slot symbol, the throughput is equal to 1270 Mbps.

FIG. 8B illustrates an example composition of a packet of user plane data (e.g., the first packet 401 or a subsequent packet 402) which is transferred across the fronthaul interface 12 in the symbol-by-symbol manner described with reference to FIGS. 1, 2, 4A, 4B, 6A and 6B.

With the same operating parameters (i.e., 2×2 MIMO, High Code Rate (CR=0.92), 64 QAM single UE per TTI), the maximum throughput across the interface on a symbol by symbol basis as described herein may be approximately 230 Mbps (this assumes that two packets are transferred per symbol and that the payload of each packet is 900 bytes (=12 subcarriers×100 resource blocks×6/8 bits per symbol×1 codeword)). Thus, the symbol-by-symbol transfer may provide nearly a five times reduction in required fronthaul interface bandwidth compared with that of the legacy method.

FIG. 8C shows the fronthaul throughput of user plane data for one TTI for all 14 time-slot symbols for a system employing symbol-by-symbol interface transfer which utilizes the same operating parameters as described with reference to FIG. 8B. As can be seen, except for the time period (denoted Slot 0, Sym 0), which is used to send the control information packets 400, 405, for all subsequent time periods the fronthaul throughput is near-constant (and certainly far closer to constant than the legacy method which may have two or more slots with a very high throughput, with the remaining slots being unused). In the illustrated example, throughput of user plane data is slightly lower in some time periods because the data transferred in those period carry extra "signaling" overhead, which may include one or more of physical broadcast channel (PBCH) signaling, primary synchronization signals (PSS), secondary synchronization signals (SSS), and pilot tones.

Figure 11:
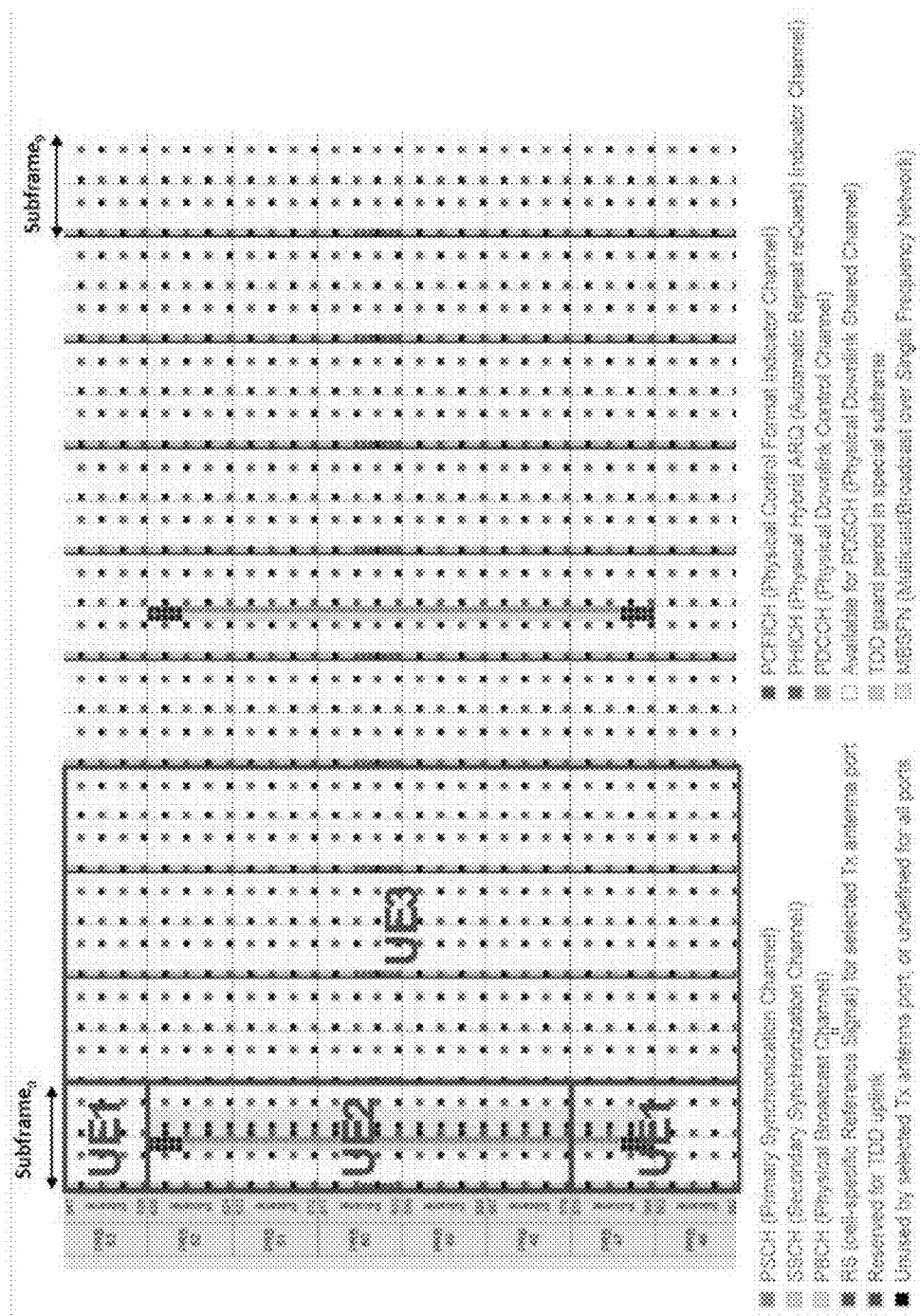
FIG. 11 illustrates a LTE Resource Block Mapping example.

FIG. 11 shows a LTE Resource Block Mapping example. User are mapped from PRB 0 to PRB 99. For simplicity, FIG. 11 shows only PRB 46-53. Although the example in FIG. 11 illustrates a 100 PRBs, which is equal to the largest bandwidth choice in 4G LTE, this should not be seen as limiting. For example, in 5G LTE this number could be different. The DL scheduler knows the exact number of resource elements available for PDSCH. In 4G LTE every PRB has 12 rows and 14 symbols. However PDSCH symbols can only be placed in the white squares. Symbol$_0$ of each 1 mSec subframe is reserved for signaling, which provides a ~71 μSec delay. In each TTI subframe the DL scheduler sends a message to the RB Mapper (such as Resource Element Mapping 115 block in FIG. 5) which includes the full PRB list for each scheduled UE (FIG. 11 shows 3 scheduled UEs, namely, UE1, UE2, and UE3). Rows describe the frequency domain and columns the time domain. The RB Mapper fills the PDSCH symbols for UE1 in the white resource elements, which are represented as squares in the resource block map. In this example, the symbols scheduled for UE1 are non-contiguous and sent over PRB46, PRB47 and PRB53 of the first 1 mSec subframe. The RB Mapper performs the mapping using the following order: Starting at symbol 0 of PRB46 towards PRB47, skipping to PRB53 and then returning to PRB46 symbol 1 until symbol 13 of PRB53 is reached.

Generally, LTE resource mapping is performed according to the following pseudocode (referred to herein as Pseudocode 1):

```
1:    Let i = 0
2:    For l = 0 to 13
3:        For k = 0 to 100*12−1
4:            If White(k, l) = True and USER(u).MappedPRB(k/12) =
              True then
5:                i = i+1
6:                Map symbol(i) for this user
7:            End If
8:        Next k
9:    Next l
```

In Pseudocode 1 above, (k, l) points to a square in the Resource Map, where k is the row number and l the column number. In LTE, k represents the frequency domain index and l represents the time domain index. White(k, l) is a Boolean lookup table with the values of True for any square on a Resource Map that is available for PDSCH. To achieve the correct order k must be the inner loop and l the outer loop. It is also noted that line 3 above assumes PRB=0 to 99, and each has 12 subcarriers 0 to 11, e.g., as shown in the example in FIG. 11. Therefore the last subcarrier in this example is k=1199.

According to some example embodiments, an algorithm is provided that can calculate in real time, in the cloud (e.g., cloud 20 shown in FIG. 1) which of all the DL codewords' bits are required to be sent over (from the cloud to the eNb) in any given OFDMA symbol time. As a result only 7.1% of the bits are selected in each symbol time. (Since in LTE a symbol time is about 7.1 μSec long). This provides the opportunity to stream the symbols over an interface between the cloud and the eNb in a constant, or close to constant bit rate.

Referring again to FIG. 5, the functions associated with the blocks above the split may be implemented at L1 PHY DL (C) 13, which for example may correspond to a cloud server, and the functions associated with the blocks below the split are implemented at L1 PHY DL (R) 11 implemented at an eNB. However, as indicated by FIG. 5, the interface may be at other locations. The different blocks shown in FIG. 5, include two main classes of functions which are referred to as FIR (Finite Impulse Response) class and IIR (Infinite Impulse Response) class, respectively. It is noted that this is true for both 4G and 5G version of LTE.

The FIR Class has a Finite Impulse Response and therefore it is possible to calculate it's over the air impact. For example, the modulation block 112, Layer Mapping block 113, Precoding block 114, Resource Element Mapping block 115, and Front End and DFE block 117 (e.g., iFFT) are all FIR which means their response to a single bit changing from 0 to 1 is limited in time duration and would effect a finite number of symbols at the output.

The IIR Class has an Infinite Impulse Response and therefore their response to a single bit changing from 0 to 1 (relative to an identical bit stream) will affect all the symbols at the output up to a duration of a full TTI. For example, Scrambling block 136, Channel Coding block 133 are IIR and have a response that can affect a full 1 mSec TTI of transmission over the air.

Embodiments described herein allow any block of the FIR Class to be converted to a streaming block. Although 5G is still under debate in the 3GPP standard body, the embodiments described are applicable for any FIR Class.

Figure 12:
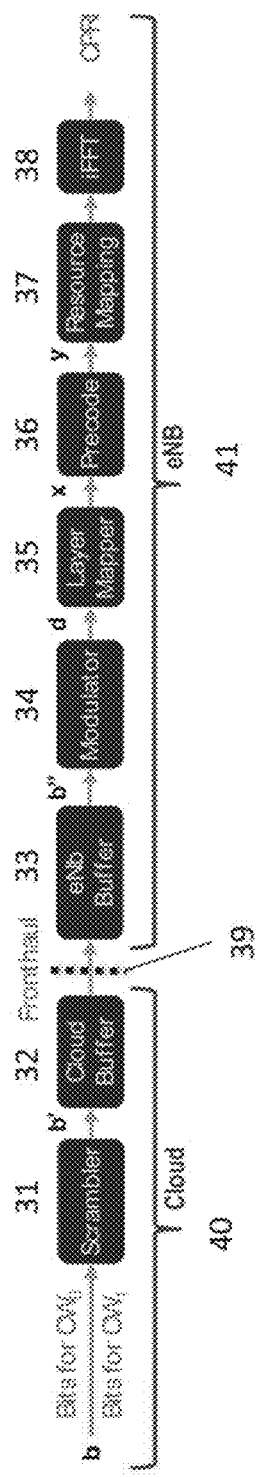
FIG. 12 shows a simplified block diagram showing input and output at different blocks in a downlink process in accordance with exemplary embodiments.

According to certain embodiments, an algorithm is derived for selecting the required input symbols for each block. Referring now to FIG. 12, this figure is a simplified block diagram showing input and output at different blocks (or stages) for downlink in accordance with exemplary embodiments. Blocks 31 and 32 are implemented at components in the cloud 40, such as at one or more central baseband processing apparatuses 14 as shown in FIG. 1, and blocks 33-38 are implemented at an eNB 41, such as remote processing apparatus 11 for example. For simplicity, FIG. 12 shows only one of antenna ports. It is noted that in FIG. 12, b, b' and b" represent bit streams, and d, x and y represent modulated symbols. A bit can carry a value of only 0 or 1, while symbols are complex numbers that include real and imaginary values and therefore each symbol can carry more data.

Exemplary embodiments described herein provide techniques for selecting the required input symbols for each block beginning with the Resource Mapping block 37. The algorithm steps backwards through Precoder block 36, Layer Mapper block 35, until reaching the Modulator block 34 input. It is noted that this approach is general enough such that any split point can be selected for implementation. As technology evolves over time, in the future the split point can be moved closer and closer to the antenna, but the embodiments described herein will still remain useful. The analysis performed for each of these blocks is discussed in more detail below.

Figure 13:
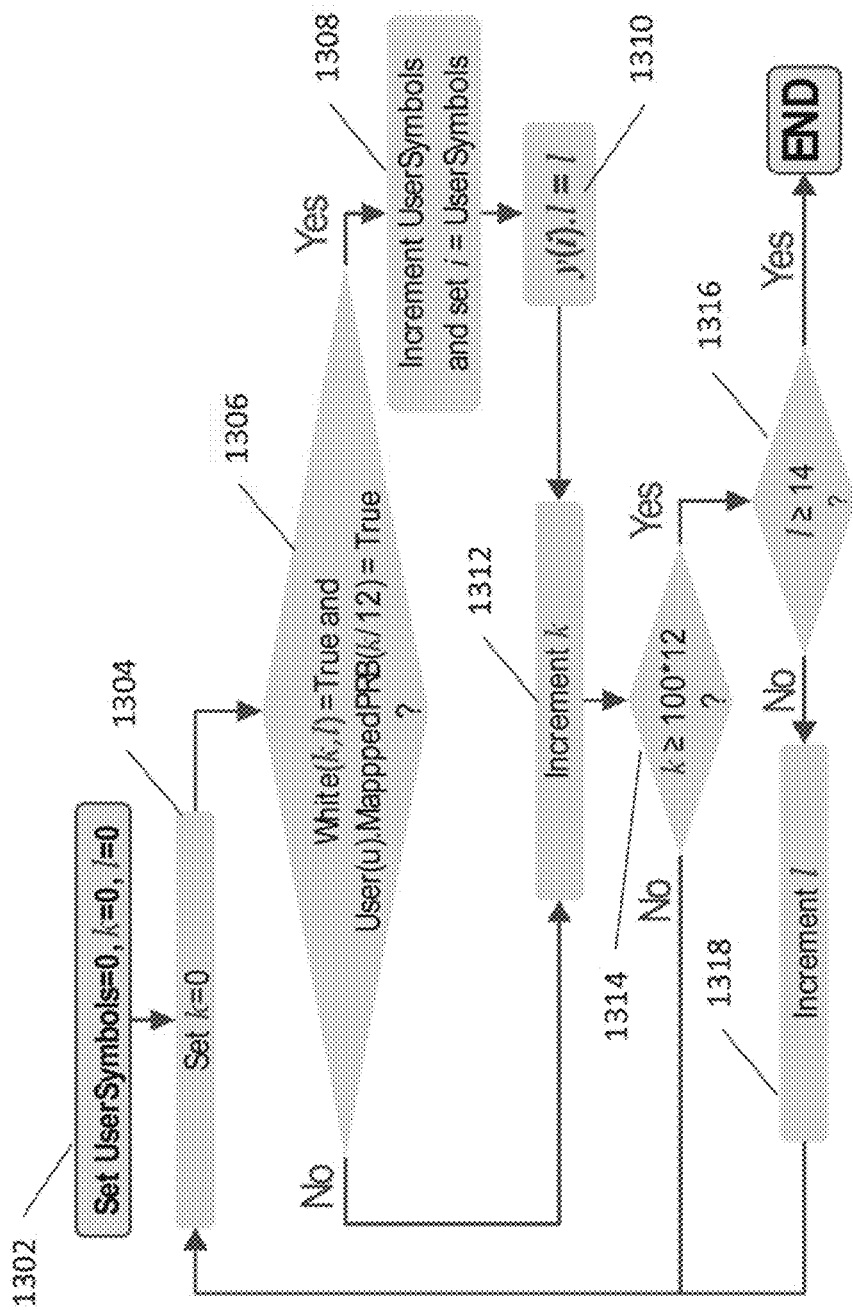
FIG. 13 shows a logic flow diagram for calculating the pointer to a resource element in a resource block map for each scheduled user in accordance with exemplary embodiments.

Determining Resource Mapping Input: Let y(i) denote the symbol stream coming out from the Precoder block 36 (which is used as input for Resource Mapping block 37). Referring also to FIG. 13, this figure shows a logic flow diagram for calculating the pointer to a resource element in a resource block map for each scheduled user. It is noted that the parameters for this figure relate to the algorithm described above for LTE resource mapping, however the method is easily adapted to 5G. In particular, at 1302 UserSymbols, k, and l are set to zero. At 1304, k is set to zero. At 1306, if lookup table White(k,l) is true and User(u). Mapped PRB(k/12) is true then UserSymbols is incremented and i is assigned the value of the UserSymbols as shown at 1308. Otherwise, flow continues to block 1312. At 1310, y(i).l is assigned the value of 1, where y(i).l is the pointer for a scheduled user. At 1312, k is incremented. At 1314, if k is greater than or equal to 100*12 then flow continues to 1316, otherwise flow continues to 1304. At 1316, if l is less than 14 flow continues to 1318 where l is incremented and i is set to 0 at block 1304. The algorithm is complete when l is greater than or equal to 14 at 1316. As can be seen, this algorithm calculates the y(j).l pointer for each scheduled user. In a similar way, k may be calculated at 1310 as well, however this algorithm does not require the bookkeeping of k. The k pointer is only mentioned here for completeness, but is not used by the exemplary embodiments. This is a Precoder pointer to a (k,l) square on the Resource Map at its output y.

The lookup tables in FIG. 13 are updated by the scheduler every TTI subframe. White(k,l) is a fixed look-up table saved in the cloud, and USER(u). Mapped PRB(k/12) is a lookup table which is binary TRUE for any PRB that user u is scheduled for. It is noted that in 4G and 5G there are 12 subcarriers per PRB (Integer of k/12), however the final 5G standard may specify a different number of subcarriers per PRB. The LTE DL scheduler at the cloud will update these lookup tables every subframe. It is noted that since integer pointers need no more than 16 bits, there is no need to use complex numbers or to multiply or divide. Only short integer additions are needed for each symbol which will further accelerate this computing task at the cloud. This procedure also does not need to know the information bits or neither any of the processed data by any of the blocks in the DL diagram shown in FIG. 12. The DL scheduler needs to share these lookup tables with the eNb anyway since they are needed for the actual resource mapping.

Determining Precoder Input: The next step is to determine the input for the Precoder block 36. Precoder block 36 converts the symbols from the multiple layers x and outputs the symbols mapped for each antenna, which are denoted as y. The number of antenna ports output by the precoder 36 must be equal or larger than the number of the (input) layers.

The conversion could be one layer to one antenna, but one of the reasons for precoding is for antenna beamforming. By creating a linear combination of the layers, each antenna can become part of a smart beamforming scheme. The precoder 36 can also support transmit diversity. For the case of transmission on a single antenna port, the (k,l) pointers are exactly the same, namely, x(j).k=y(j).k and x(j).l=y(j).l which makes it the trivial case.

Figures 14A, 14B:
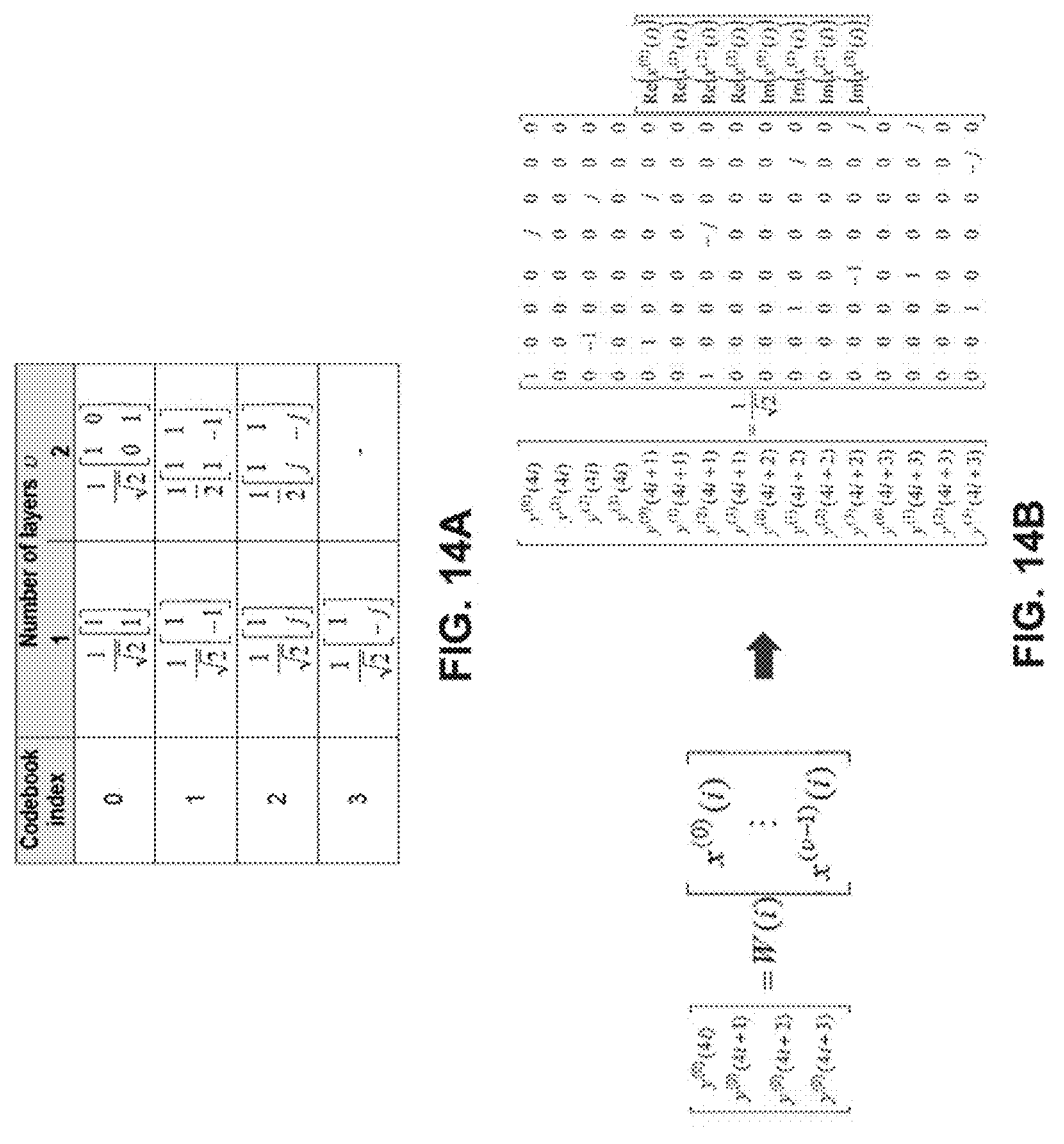

For the case of spatial multiplexing, for example, two or four antenna ports may be supported. The antenna port number may be denoted asp and the layer number epsilon may be denoted as v. For example, v=0, 1, 2, . . . , and p=0, 1, 2, . . . P. In this case a precoding matrix of 4×4 or smaller may be denoted as W(i). FIGS. 14A and 14B show a precoding matrix for two antenna spatial multiplexing and a precoding matrix for four antenna spatial multiplexing, respectively. As can be seen, for the case of 4 layers and p=4 antenna ports, the precoding matrix becomes much larger. It also specifies interleaving over time i=0, 1, 2, 3, meaning each x(i) needs four (k,l) pointers. Thus, a symbol input x(i) from 4 layers is affecting 4 antenna ports y(i) during OFDMA symbol i=0, 1, 2, 3. Since these 4 y(i) symbols will be mapped to different locations, it means that 4 different pointers need to be kept in the x(i) book. In other words, for each x(i) symbol four (k, l) pointers need to be calculated instead of one.

The following pseudocode (referred to herein as Pseudocode 2) describes how to find (k, l) pointers for Single Antenna x( ) where UserSymbols is the length of y ( ):

```
1:    Redim x(0 to UserSymbols – 1)
2:    For i = 0 to UserSymbols –1 Step 1 ' For the case of 1 antenna
      port
3:        x(i).Layer0.L = y(i + 0).L
4:    Next i
```

The following pseudocode (referred to herein as Pseudocode 3) describes how to find (k, l) pointers for Dual Antenna x( ):

```
1:    For i = 0 to UserSymbols –1 Step 2 ' For the case of two antenna
      ports
2:        x(i/2).Layer0.L = y(i + 0).L
3:        x(i/2).Layer1.L = y(i + 1).L
4:    Next i
```

The following pseudocode (referred to herein as Pseudocode 4) describes how to find (k, l) pointers for Four Antennas x( ):

```
1:    For i = 0 to UserSymbols –1 Step 4 ' For the case of Four antenna
      ports
2:        x(i/4).Layer0.L = y(i + 0).L
3:        x(i/4).Layer1.L = y(i + 1).L
4:        x(i/4).Layer2.L = y(i + 2).L
5:        x(i/4).Layer3.L = y(i + 3).L
6:    Next i
```

For Pseudocode 4 (i.e., for the 4 antennas case) each x( )has (k, l) pointers for 4 layers. However, since W(i) is a 4×4 matrix each output is a linear combination of the 4 input layers. For example y(i+3) is a symbol that is the result of all four x(i/4) symbols. In order to process y(i+3) in the eNB all four layers of x(i/4) must be sent from the cloud to the eNB simultaneously, but x(i/4).Layer 3.L will not be enough. Therefore, the (k, l) pointers for all 4 layers must be kept.

Figure 15:
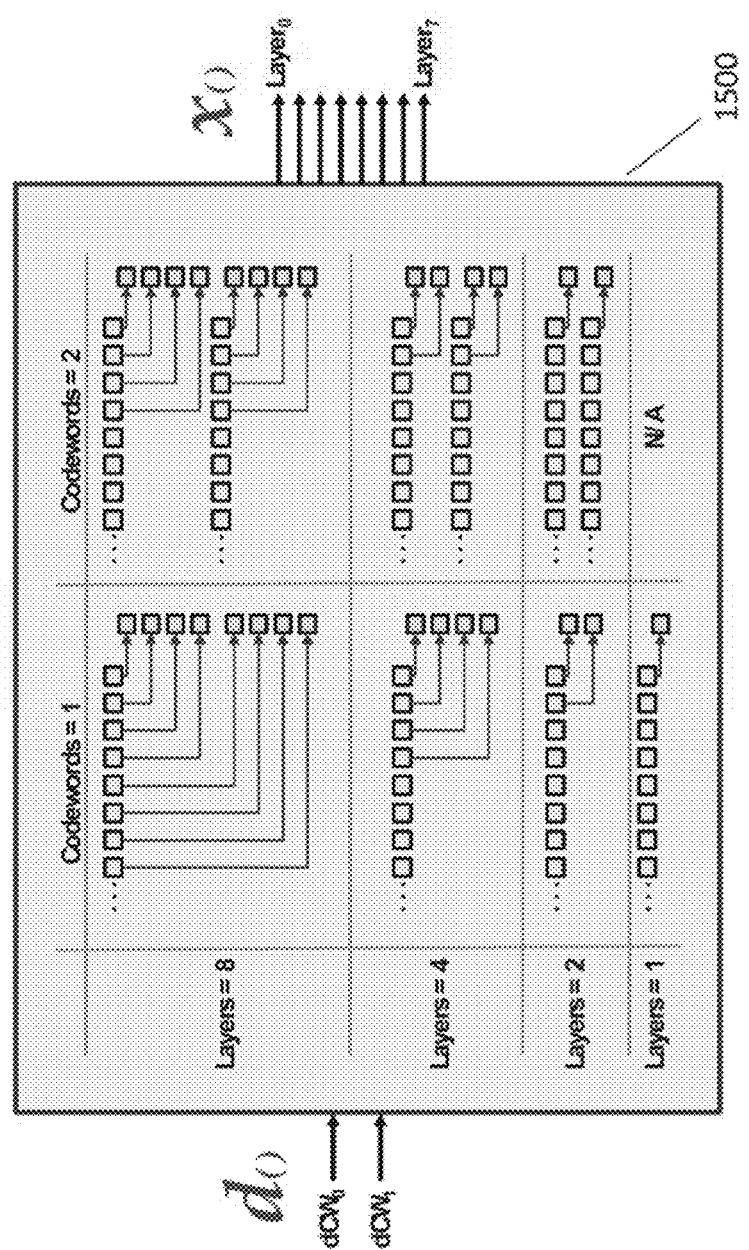
FIG. 15 is an example of layer mapping according to LTE where 2 codewords are shown for 1 and 2 codewords, and for 1, 2, 4, and 8 layers.

Determining Layer Mapper Input: After determining the precoder input, the Layer Mapping block 35 input must be determined. Typically, the input to the Layer Mapper includes one or two d( )codewords, and the output, denoted x( ), consists of one or more layers. FIG. 15 illustrates an example of layer mapping according to LTE showing 1 and 2 codewords for 1, 2, 4, and 8 layers. It is noted that the Layer Mapper 1500 is simply a parallel to serial converter. The trivial case is when Layers=1 and Codewords=1, and the (k, l) pointers may be found based on following pseudo-code (referred to herein as Pseudocode 5):

```
1:      Set n= 0
2:      For j = 0 to UserSymbols−1
3:          dCW0(n).Layer0.L = x(j).Layer0.L
4:          n = n+1
5:      Next j
```

For the case Layers=4 and Codewords=1, each dCW symbol is mapped to one layer only, however since each layer x( ) resulted four pointers (as discussed above in reference to determining the precoder input), all four pointers must be kept. The following example pseudocode can be used in this case (referred to herein as Pseudocode 6):

```
1:      For j = 0 to UserSymbols − 1
2:          dCW0(n + 0).Layer0.L = x(j).Layer0.L
3:          dCW0(n + 0).Layer1.L = x(j).Layer1.L
4:          dCW0(n + 0).Layer2.L = x(j).Layer2.L
5:          dCW0(n + 0).Layer3.L = x(j).Layer3.L
6:          dCW0(n + 1).Layer0.L = x(j).Layer0.L
7:          dCW0(n + 1).Layer1.L = x(j).Layer1.L
8:          dCW0(n + 1).Layer2.L = x(j).Layer2.L
9:          dCW0(n + 1).Layer3.L = x(j).Layer3.L
10:         dCW0(n + 2).Layer0.L = x(j).Layer0.L
11:         dCW0(n + 2).Layer1.L = x(j).Layer1.L
12:         dCW0(n + 2).Layer2.L = x(j).Layer2.L
13:         dCW0(n + 2).Layer3.L = x(j).Layer3.L
14:         dCW0(n + 3).Layer0.L = x(j).Layer0.L
15:         dCW0(n + 3).Layer1.L = x(j).Layer1.L
16:         dCW0(n + 3).Layer2.L = x(j).Layer2.L
17:         dCW0(n + 3).Layer3.L = x(j).Layer3.L
18:         n = n+4
19:     Next j
```

The case of Layers=8 and Codewords=2 is the most complex case, and the following pseudocode (referred to herein as Pseudocode 7) may be used to find (k, l) pointers for Layers=8, Codewords=2 for dCW0( ), dCW1( ):

```
1: For j = 0 to UserSymbols − 1
2:     dCW0(n + 0).Layer0.L = x(j).Layer0.L
3:     dCW0(n + 0).Layer1.L = x(j).Layer1.L
4:     dCW0(n + 0).Layer2.L = x(j).Layer2.L
5:     dCW0(n + 0).Layer3.L = x(j).Layer3.L
6:     dCW0(n + 1).Layer0.L = x(j).Layer0.L
7:     dCW0(n + 1).Layer1.L = x(j).Layer1.L
8:     dCW0(n + 1).Layer2.L = x(j).Layer2.L
9:     dCW0(n + 1).Layer3.L = x(j).Layer3.L
10:    dCW0(n + 2).Layer0.L = x(j).Layer0.L
11:    dCW0(n + 2).Layer1.L = x(j).Layer1.L
12:    dCW0(n + 2).Layer2.L = x(j).Layer2.L
13:    dCW0(n + 2).Layer3.L = x(j).Layer3.L
14:    dCW0(n + 3).Layer0.L = x(j).Layer0.L
15:    dCW0(n + 3).Layer1.L = x(j).Layer1.L
16:    dCW0(n + 3).Layer2.L = x(j).Layer2.L
17:    dCW0(n + 3).Layer3.L = x(j).Layer3.L
18: ' ------------------------------ Codeword1 ------------------------------
19:    dCW1(n + 0).Layer0.L = x(j).Layer4.L
20:    dCW1(n + 0).Layer1.L = x(j).Layer5.L
21:    dCW1(n + 0).Layer2.L = x(j).Layer6.L
22:    dCW1(n + 0).Layer3.L = x(j).Layer7.L
23:    dCW1(n + 1).Layer0.L = x(j).Layer4.L
24:    dCW1(n + 1).Layer1.L = x(j).Layer5.L
25:    dCW1(n + 1).Layer2.L = x(j).Layer6.L
26:    dCW1(n + 1).Layer3.L = x(j).Layer7.L
27:    dCW1(n + 2).Layer0.L = x(j).Layer4.L
28:    dCW1(n + 2).Layer1.L = x(j).Layer5.L
29:    dCW1(n + 2).Layer2.L = x(j).Layer6.L
30:    dCW1(n + 2).Layer3.L = x(j).Layer7.L
31:    dCW1(n + 3).Layer0.L = x(j).Layer4.L
32:    dCW1(n + 3).Layer1.L = x(j).Layer5.L
33:    dCW1(n + 3).Layer2.L = x(j).Layer6.L
34:    dCW1(n + 3).Layer3.L = x(j).Layer7.L
35:    n = n+4
36: aNext j
```

It is clear from Pseudocode 5-7 above how the input may be determined for other cases for Layer Mapping block 35.

Figure 16:
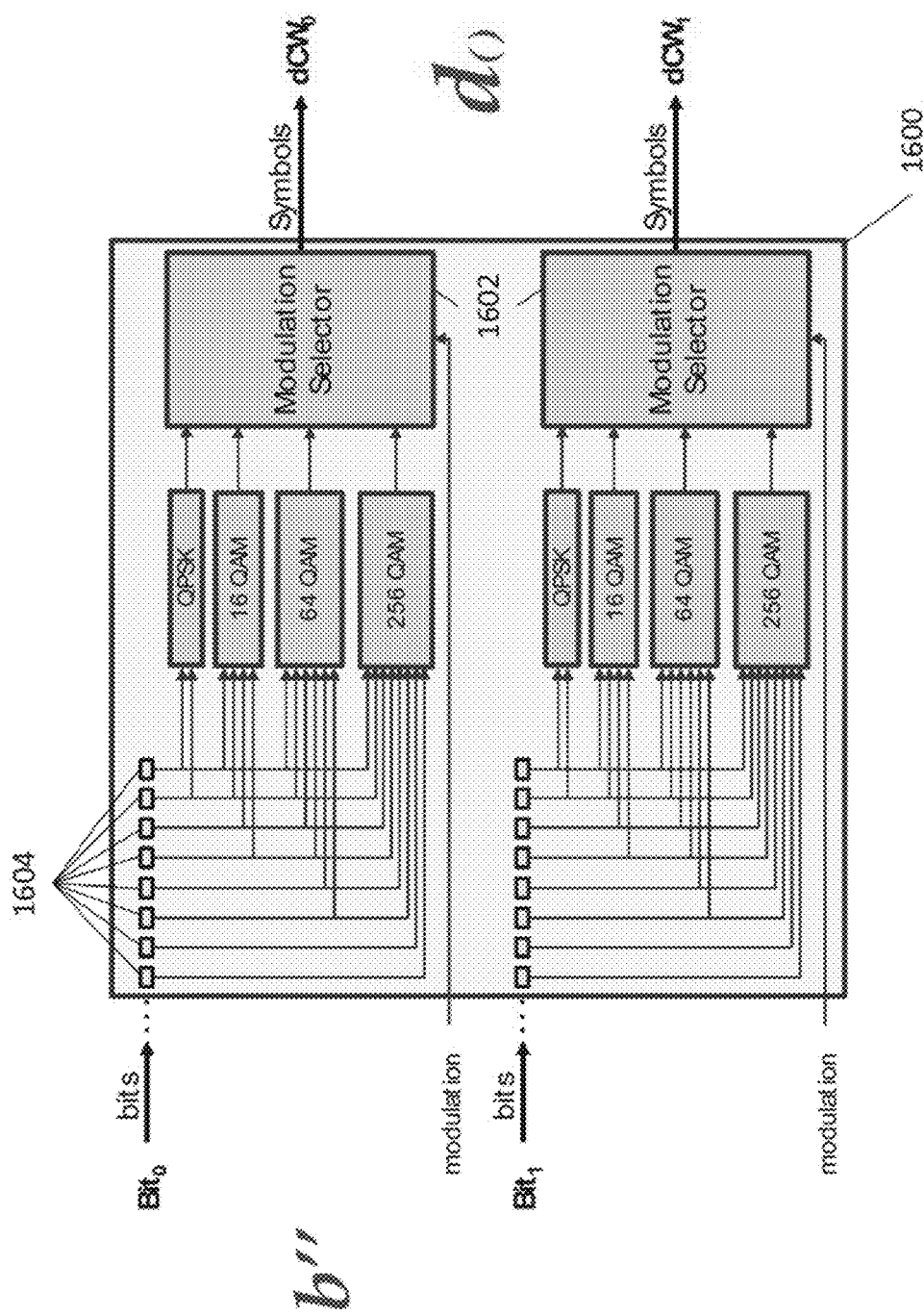
FIG. 16 an example LTE modulator for QPSK, 16 QAM, 64 QAM or 245 QAM.

Determining the Modulator Input: The input for modulator block 34 in FIG. 12 can then be determined. Typically, an LTE modulator converts bits into symbols, and since layer L2 sends one or two codewords to PHY layer L1, the modulator needs to process one or two codewords as well. FIG. 16 illustrates an example LTE modulator 1600 for QPSK, 16 QAM, 64 QAM or 245 QAM. The Modulator 1600 includes a Modulation selector 1602 which can choose one of the supported modulations (i.e., QPSK, 16 QAM, 64 QAM or 245 QAM). As an example, for 256 QAM, 8 serial bits, e.g., as represented by blocks 1604, are required at the input to make a symbol. The input to 256 QAM is represented by the corresponding arrows from the block 1600. The resulting symbol consists of a complex number in the format of I+jQ, which may be stored in a memory. Accordingly, any of the 8 input bits can only affect one symbol at the output. The following pseudocode can determine how many serial bits are required at the input of the Modulator block 34:

```
1:      If QPSK Set Bits = 2
2:      If QAM16 Set Bits = 4
3:      If QAM64 Set Bits = 6
4:      If QAM256 Set Bits = 8
```

The following pseudocode (referred to herein as Pseudocode 8) may be used for setting the (k, l) pointers for Codeword$_0$ at the Modulator 34 block input, in the case of QAM 16.

```
1:      For i = 0 to UserBits − 1 Step 1
2:          For j = 0 to Bits−1
3:              Bit0(Bits*i + j) = dCW0(i)
4:          Next j
5:      Next i
```

It is noted that line 3 above copies 1 for every layer 0, 1, 2 or 3 in a single operation such as lines 31, 32, 33, 34 of Pseudocode 7.

If two codewords are used, the following pseudocode may be used (referred to herein as Pseudocode 9):

```
1:         For i = 0 to UserBits − 1 Step 1
2:             For j = 0 to Bits−1
3:                 Bit0(Bits*i + j) = dCW0(i)
4:                 Bit1(Bits*i + j) = dCW1(i)
5:             Next j
6:         Next i
```

Determining Input for eNB Buffer: Once the input for the Modulator block 34 is determined, the input to the eNB buffer 33 in FIG. 12 must be determined. In the example shown in FIG. 12, this input is sent from the cloud buffer block 32 via the fronthaul interface 39. It is noted that all of the previous (k,l) pointer's calculations were implemented in the cloud 40, but now when each bit at the input of the Modulator block 34 has its own (k, l) pointer, we will show how the cloud 40 selects what bits to send and when. The cloud 40 accomplishes this in the Cloud Buffer stage 32.

The following pseudocode (referred to herein as Pseudocode 10) is used by the cloud 40 to rearrange the bits in the right order so that bits are sent out only when their corresponding symbols are needed by the eNB. It returns two long integer values: BufferThisBitFirst and BufferThisBitLast. These values represent the first and last bits in the original stream that are to be loaded into the Cloud-Buffer during the Current Symbol L time:

```
1:     Set L = Current Symbol
2:     For u = 1 to NoOfUsers
3:         ' Choosing bits for Codeword0:
4:         Set BufferThisBitFirst = 999999
5:         Set BufferThisBitLast = 0
6:         For j = 0 to User(u).UserBits−1 Step Bits
7:             Set LoadThisBit = False
8:             If User(u).Bit0(j).Layer0.L = L then Set LoadThisBit = True
9:             If User(u).Bit0(j).Layer1.L = L then Set LoadThisBit = True
10:            If User(u).Bit0(j).Layer2.L = L then Set LoadThisBit = True
11:            If User(u).Bit0(j).Layer3.L = L then Set LoadThisBit = True
12:            If LoadThisBit = True then
13:                if BufferThisBitFirst > j then BufferThisBitFirst = j
14:                if BufferThisBitLast < j then BufferThisBitLast = j + 3
15:            End if
16:        Next j
17:        <The code for loading the Cloud-Buffer with the block from
               address BufferThisBitFirst through BufferThisBitLast >
18:        ' Choosing bits for Codeword1:
19:        <Similar code loads the data for Codeword1>
20:    Next u
```

Pseudocode 10 above tells the Cloud 40 that the j index for the first and last bit coming out of the Scrambler block 31 is to be loaded to the Cloud Buffer, and loads the Bit$_0$ buffer for all the users. Similar code for users with two codewords loads the Bit$_1$ buffer, which for simplicity is not shown.

The following pseudocode (referred to herein as Pseudocode 11) shows an example of the buffer format for Cloud Buffer 32 when it is ready to be sent to the eNB buffer 33. The number of bits per user is given by $N_u$=BufferThisBitLast−BufferThisBitFirst+1.

```
1:     SymbolID = 0
2:     User = 0 : CodeWord = 0
3:     Long integer User0 BufferThisBitFirst (64 Bit)
4:     Long integer User0 BufferThisBitLast (64 Bit)
5:     All the N_u bits for User0
6:     Repeat the above for SymbolID = 0, CodeWord = 1
7:     User = 1 : CodeWord = 0
8:     Long integer User1 BufferThisBitFirst (64 Bit)
9:     Long integer User1 BufferThisBitLast (64 Bit)
10:    All the N_u bits for User1
11:    Repeat the above for SymbolID = 0, CodeWord = 1
12:    User = 2 : CodeWord = 0
13:    Long integer User2 BufferThisBitFirst (64 Bit)
14:    Long integer User2 BufferThisBitLast (64 Bit)
15:    All the N_u bits for User2
16:    Repeat the above for SymbolID = 0, CodeWord = 1
17:    User = 3 : CodeWord = 0
18:    Long integer UserU BufferThisBitFirst (64 Bit)
19:    Long integer User3 BufferThisBitLast (64 Bit)
20:    All the N_u bits for User3
21:    Repeat the above for SymbolID = 0, CodeWord = 1
       ....
22:    Continue the above for all users
       ....
23:    Repeat the above for SymbolID = 1
24:    Repeat the above for SymbolID = 2
25:    Repeat the above for SymbolID = 3
       ....
26:    Repeat the above for SymbolID = 13
``` eNB-Buffer: The data blocks in the pseudocode above are sent from the Cloud Buffer 32 to the eNB Buffer 33. Both of these buffers are identical in size and in format structure and both have left and right sections for codeword$_0$ and codeword$_1$, respectively.

Each data block b' arriving at the eNB 41 has a precise start and end pointers to the eNB Buffer 33. The start and end pointers are specified by the 64 bit integer at BufferThisBitFirst and BufferThisBitLast respectively. The eNB-Buffer feeds the b" bits to the Modulator. Whenever a new block b' arrives, it will send a copy of that b" to the modulator. (Since any other bits outside the current block could be still missing, the modulator does not need to worry about any of them until they arrive later).

The rest of the downlink stages process the current block of data all the way through the RB-Mapper. This process repeats until the very last user to ensure all the symbols with the same l pointer are transmitted over the air as soon as possible, and there is no need to wait for other symbols. The k pointer is only mentioned in the pseudocode above for completeness, but is not used by the exemplary embodiments.

It is noted that the same bit may end up being sent twice (e.g., sent at a symbol time=l, and sent again later during symbol time l+1). This makes sense since the precoding stage can spread a symbol over 4 or more symbols which as a result can overflow to the next l. When this happens, the overall number of bits over the fiber interface may grow a little bit, but this is a very small growth. To completely eliminate this growth, one can adjust BufferThisBitFirst of the next symbol to skip a few bits so that it starts at the first bit which has not been previously sent. This may reduce the overlapping caused by not sending the same bit twice to the same target location at the eNB-Buffer.

In some embodiments, an apparatus, such as one or more central processing apparatuses in the cloud for example, may determine a first subset of downlink user plane data corresponding to one or more wireless user equipments in a wireless network. The first subset of downlink user plane data may include bits required by a remote processing apparatus to select a first symbol for transmission to the one or more user equipments at a first time slot. The selected streaming, via a fronthaul interface, the selected first subset immediately followed by at least one further selected subset of downlink user plane data, wherein the at least one further subset of user plane data comprises only the bits required to generate a second symbol for transmission to the one or more of the wireless user equipments at a second time slot immediately following the first time slot.

Figure 9:
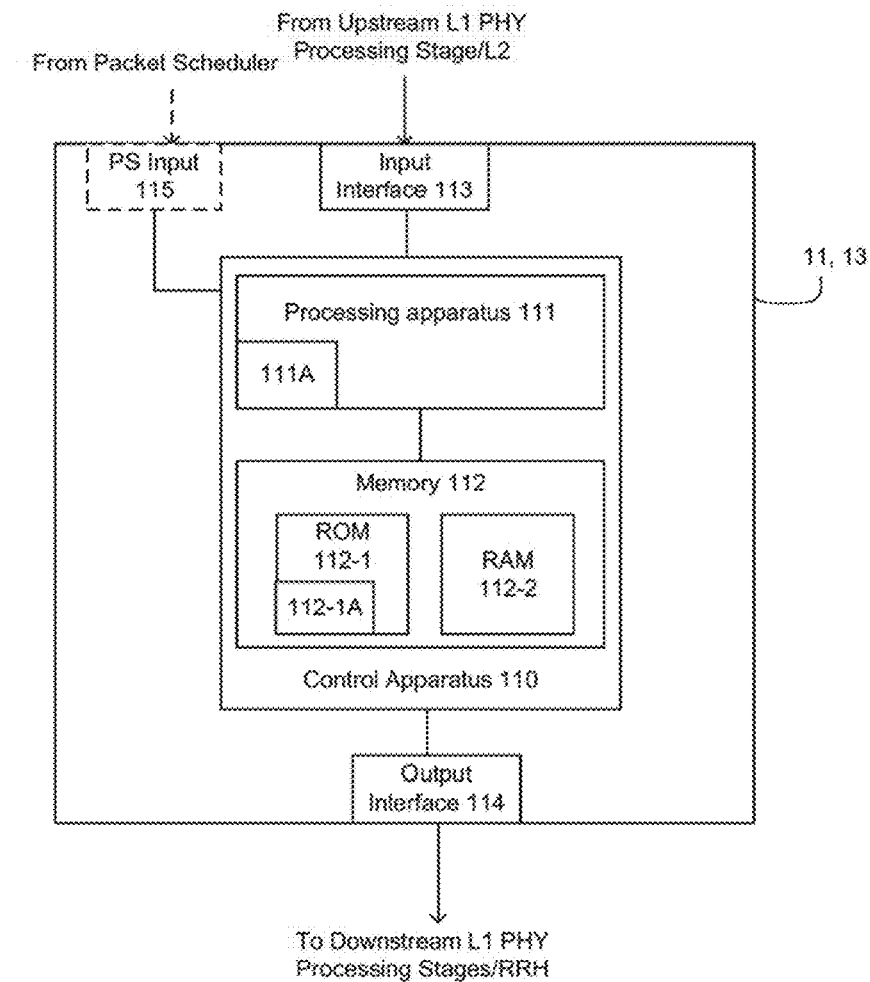
FIG. 9 is a schematic illustration of an example hardware configuration which may make up the remote and centralized L1 PHY processing apparatuses.

FIG. 9 is an example configuration of FIG. 9 is an example configuration of apparatus which may make up either of the remote and centralized L1 PHY apparatuses 11, 13.

The apparatus 11, 13 comprises control apparatus 110 which may provide the functions of each of the L1 PHY processing stages assigned to the remote or centralized L1 PHY apparatuses 11, 13, depending on the location of the split fronthaul interface 12. For example, in FIG. 5 the front haul interface 12 is split between the scrambling stage 136 and the modulation stage 112. For this example, when the apparatus 11, 13 is the remote L1 PHY processing apparatus 13 then the control apparatus 110 may provide the functions of at least the L1 PHY processing stages 131-136 as shown in FIG. 5.

The apparatus 11, 13 additionally comprises an input interface 113 via which data is received at the apparatus 11, 13 (from an L2 processing stage, when the apparatus 11, 13 is the centralized L1 PHY processing apparatus 13, and from an upstream L1 PHY processing stage when the apparatus 11, 13 is the remote L1 PHY processing apparatus 13). The apparatus 11, 13 further comprises an output interface 114 for transferring data out of the apparatus 11, 13 (to the remote L1 PHY processing apparatus 13 when the apparatus is the centralized L1 PHY processing apparatus 11, and to the RRH 10 when the apparatus is the remote L1 PHY processing apparatus 11). For example, when the apparatus 11, 13 is the centralized L1 PHY processing apparatus 13 the output interface 114, may be utilized to transfer data from the cloud buffer 32 to the remote eNB buffer 39 as shown in FIG. 12.

The input and output interfaces 113, 114, which may in fact be bi-directional interface, may be in the form of wired interfaces, such as but not limited to Ethernet interfaces.

When the apparatus 11, 13 is the centralized L1 PHY processing apparatus 13, the apparatus may further comprise a dedicated packet scheduler interface for receiving data from the packet scheduler 115.

As will of course be appreciated, the apparatus 11, 13 may include various other components which aren't illustrated in FIG. 9.

The control apparatus 110 may comprise processing apparatus 111 communicatively coupled with memory 112. The memory 112 has computer readable instructions 112-1A stored thereon, which when executed by the processing apparatus 111 causes the control apparatus 110 to cause performance of various ones of the operations described with reference to FIGS. 1 to 7B and 11-17. For example, when the apparatus 11, 13 is the centralized L1 PHY processing apparatus 13, the computer readable instructions 112-1A may include at least instructions in accordance with the pseudocode examples described above, which may be executed by the processing apparatus 111; and the Memory 112 may, for example, store the bookkeeping of (k, l). The control apparatus 110 may in some instance be referred to, in general terms, as "apparatus".

The processing apparatus 111 may be of any suitable composition and may include processor circuitry 111A of any suitable type or suitable combination of types. Indeed, the term "processing apparatus" should be understood to encompass computers having differing architectures such as single/multi-processor architectures and sequencers/parallel architectures. For example, the processing apparatus 111 may be programmable processor circuitry that interprets computer program instructions 112-1A and processes data.

The processing apparatus 111 may include plural programmable processors. Alternatively, the processing apparatus 111 may be, for example, programmable hardware with embedded firmware. The processing apparatus 111 may alternatively or additionally include one or more specialized circuit such as field programmable gate arrays FPGA, Application Specific Integrated Circuits (ASICs), signal processing devices etc. In some instances, processing apparatus 111 may be referred to as computing apparatus or processing means.

The processing apparatus 111 is coupled to the memory 112 and is operable to read/write data to/from the memory 112. The memory 112 may comprise a single memory unit or a plurality of memory units, upon which the computer readable instructions (or code) 112-1A is stored. For example, the memory 112 may comprise both non-volatile memory 112-1A and volatile memory 112-2. In such examples, the computer readable instructions/program code 112-1A may be stored in the non-volatile memory 112-1 and may be executed by the processing apparatus 111 using the volatile memory 112-2 for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The memory 112 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

Figure 10:
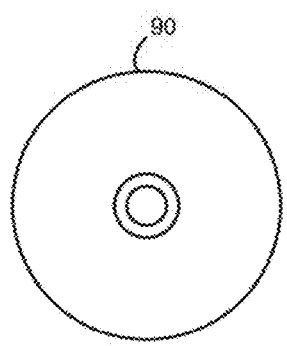
FIG. 10 is an illustration of a computer readable medium on which computer-readable instructions may be stored.

The computer readable instructions/program code 112-1A may be pre-programmed into the control apparatus 110. Alternatively, the computer readable instructions 112-1A may arrive at the control apparatus via an electromagnetic carrier signal or may be copied from a physical entity 90 such as a computer program product, a memory device or a record medium such as a CD-ROM or DVD an example of which is illustrated in FIG. 10. The computer readable instructions 112-1A may provide the logic and routines that enables the apparatuses 11, 13 to perform the functionality described above. The combination of computer-readable instructions stored on memory (of any of the types described above) may be referred to as a computer program product. In general, references to computer program, instructions, code etc., should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (i) to a combination of processor(s) or (ii) to portions of processor(s)/software (including digital signal processor(s)), software, and memory(ies) that work together to cause an apparatus, such as a eNB (or components thereof), to perform various functions) and (c) to circuits, such as a microprocessor(s) or a portion of a microprocessor(s), that require software or firmware for operation, even if the software or firmware is not physically present.

Figure 17:
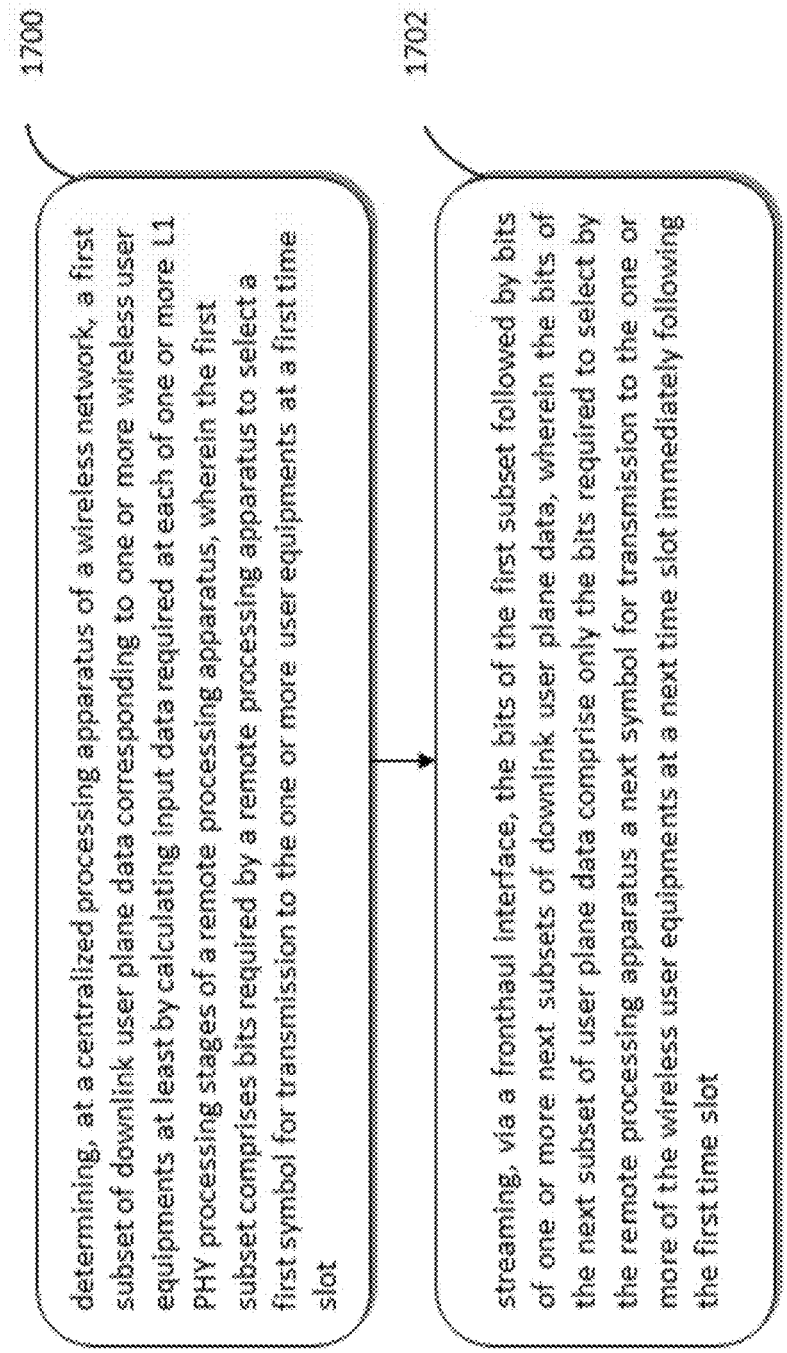
FIG. 17 is a flow charts illustrating example operations which may be performed at the centralized L1 PHY processing apparatus.

Referring now to FIG. 17, is a logic flow diagram for symbol by symbol bit streaming. This figure further illustrates the operation of an exemplary method, a result of execution of computer program instructions embodied on a computer readable memory, functions performed by logic implemented in hardware, and/or interconnected means for performing functions in accordance with exemplary embodiments.

According to one embodiment, a method includes determining, at a centralized processing apparatus of a wireless network, a first subset of downlink user plane data corresponding to one or more wireless user equipments at least by calculating input data required at each of one or more L1 PHY processing stages of a remote processing apparatus, wherein the first subset comprises bits required by a remote processing apparatus to select a first symbol for transmission to the one or more user equipments at a first time slot as indicated by block 1700; and streaming, via a fronthaul interface, the bits of the first subset followed by bits of one or more next subsets of downlink user plane data, wherein the bits of the next subset of user plane data comprise only the bits required to select by the remote processing apparatus a next symbol for transmission to the one or more of the wireless user equipments at a next time slot immediately following the first time slot as indicated by block 1702.

The one or more of L1 PHY processing stages of the remote processing apparatus may include at least one of: a modulation stage; a layer mapping stage; a precoding stage; and a resource mapping stage.

Calculating the required input data for the resource mapping stage may include: determining a pointer to a resource element in a resource map for each of the user equipments scheduled during the first time slot based at least on: a first lookup table indicating if one of the user equipments is scheduled for a PDSCH symbol transmission on a given resource element, and a second lookup table indicating whether the given resource element is designated for PDSCH transmission, wherein each of the determined pointers is associated with an input symbol of the precoding stage.

The method may further comprise updating, at the central processing apparatus, the lookup tables of one or more of the scheduled user equipments based on information received from a downlink data scheduler of the wireless network.

Calculating the input data of the precoding stage may include: deriving from the determined pointers, a set of one or more of the pointers required for transmission of each of the symbols associated with each of the scheduled user equipments, and calculating the input data of the layer mapping stage may include: associating each set of the pointers with a layer of each of the scheduled user equipments.

Calculating the input data of the modulation stage may include: selecting for each set of the pointers a corresponding input bit of the modulation stage based at least on: a number of layers and a number of codewords for the scheduled user equipment associated with the respective set of pointers.

The streaming, via the fronthaul interface, may include transmitting the bits of the first subset to a buffer of the remote processing apparatus, where the buffer provides the bits to a modulation stage of the processing apparatus.

The centralized processing apparatus may transmit, for each of the user equipments, an indication of a first bit and a last bit of the downlink user plane data that is streamed to the buffer of the remote processing apparatus.

The indication of the first bit and the last bit may be inserted within a header of the stream such the remote processing apparatus is configured to store the incoming stream in a proper location of the buffer of the remote processing apparatus.

The centralized processing apparatus may include a buffer having a same structure as the buffer of the remote processing apparatus.

The streaming may include streaming, from the buffer of the centralized processing apparatus to the buffer of the remote apparatus via the fronthaul interface, all of the bits required to select the first symbol within a time equal to one time slot, and sending an indication of a first bit and a last bit of the next subset to enable all of the bits required to select the next symbol to be streamed to the remote apparatus buffer within the time equal to one time slot.

The Resource Map may include of rows and columns representing sub-carrier frequency and time-slot indexes respectively; where each element on the resource map may carry an OFDMA symbol; and where the central processing apparatus can calculate a pointer to the location of each of those symbol.

The lookup tables may be stored at the central processing apparatus, and may be updated every subframe for one or more of the scheduled users; based on decisions of the central downlink data scheduler, and the lookup tables may be used to calculate the pointer for each of the symbols of each of the scheduled users and for each of the L1 PHY processing stages, and for each of their input and output ports; and if more than one antenna is used, then for each of the antennas; and if more than one layer is used, then for each of the layers; and if more than one codeword is used then for each of the codewords.

The central processing apparatus may calculate all the pointers at the output of the Resource Mapping stage, which may be located in any of the remote L1 PHY units, by looping through all the rows of the resource map of the remote L1 PHY units; starting from the first sub-carrier and incrementing the pointer to the last, and by using the lookup tables to skip any of the unused resource elements on the map the processor derives the pointer for each symbol at the input of the Resource Mapping stage; and whenever the last row is reached, the processor increments the pointer to the next symbol time-slot, which is the next column in the resource map until reaching the last row in the last time-slot of the map.

Calculating the input for the precoding stage may include using the calculated input pointers of claim from the resource mapping stage as the output pointers for the precoding stage and using a stepping back calculation, and deriving from these output pointers the input pointers at the precoding stage input by calculating which are required for each symbol associated with each of the scheduled users, and similarly stepping back to the Layer Mapping stage while determining the pointers for each of the layers where the number of layers is provided by the downlink scheduler, and similarly stepping back to the Modulation stage while determining the pointers for each of the layers where the number of layers is provided by the downlink scheduler; and its input bits have now an associated pointer to the Resource Map output; and if more than one layer is used, each bit includes multiple pointers, one for each layer. The selected bits for the Modulation stage may come from a fronthaul buffer which may be located at each of the remote L1 PHY units; and this buffer may be provided with indicators for a begin-of-data and an end-of-data for each user calculated and given by the central processing apparatus; and where at any given time-slot has all the necessary bits required by the L1 PHY unit at that time. The central processing apparatus may have its own fronthaul buffer which is identical in its structure to the remote processing apparatus buffer, and may be responsible for transferring to each L1 PHY unit the data its need at a given time-slot, using a close to fixed streaming data rate to avoid high bursts.

The indicators for a begin-of-data and for an end-of-data for each of the users may be calculated as part of the calculation of all the pointers at the output of the resource mapping stage. The two indicators may be inserted within the header of each stream such that the remote L1 PHY buffer can easily parse it and use it to store the incoming stream in the right location within its own fronthaul buffer. Calculating of all the pointers at the output of the resource mapping stage may include calculating only the column of each bit and ignoring the row, in order to save in memory usage, and processing power.

According to one embodiment, apparatus comprising: at least one processor; and at least one memory including computer program code which, when executed by the at least one processor, causes the apparatus to: determine, at a centralized processing apparatus of a wireless network, a first subset of downlink user plane data corresponding to one or more wireless user equipments at least by calculating input data required at each of one or more L1 PHY processing stages of a remote processing apparatus, wherein the first subset comprises bits required by a remote processing apparatus to select a first symbol for transmission to the one or more user equipments at a first time slot; and stream, via a fronthaul interface, the bits of the first subset followed by bits of one or more next subsets of downlink user plane data, wherein the bits of the next subset of user plane data comprise only the bits required to select by the remote processing apparatus a next symbol for transmission to the one or more of the wireless user equipments at a next time slot immediately following the first time slot.

According to one embodiment, a computer program product may comprise a non-transitory computer-readable medium bearing computer program code, which when executed by a device, causes the device to perform: determining, at a centralized processing apparatus of a wireless network, a first subset of downlink user plane data corresponding to one or more wireless user equipments at least by calculating input data required at each of one or more L1 PHY processing stages of a remote processing apparatus, wherein the first subset comprises bits required by a remote processing apparatus to select a first symbol for transmission to the one or more user equipments at a first time slot; and streaming, via a fronthaul interface, the bits of the first subset followed by bits of one or more next subsets of downlink user plane data, wherein the bits of the next subset of user plane data comprise only the bits required to select by the remote processing apparatus a next symbol for transmission to the one or more of the wireless user equipments at a next time slot immediately following the first time slot.

Without in any way limiting the scope, interpretation, or application of the claims appearing below, a technical effect of one or more of the example embodiments disclosed herein is achieving low latency, in particular, the cloud sends the bits required for a specific symbol time l only. Otherwise, all the scrambled bits must be sent during the first symbol time (l=0) to ensure the first symbol can be aired on time. Another technical effect of one or more of the example embodiments disclosed herein is only minimum modifications are required due to the use of the Cloud-buffer and eNB-Buffer. Another technical effect of one or more of the example embodiments disclosed herein is that the data over the fiber is sent in consistent data rate eliminating undesired large bursts in speed. Another technical effect of one or more of the example embodiments disclosed herein is that the eNB runs more efficiently which provides saving in computing speed. Undesired large bursts in speed are eliminated by streaming the data over the fiber in consistent data rate. Another technical effect of one or more of the example embodiments disclosed herein is that no feedback or help is required help from the eNB, and the cloud can figure out the (k, l) pointers on its own.

If desired, the different functions discussed herein may be performed in a different order and/or concurrently with each other. Furthermore, if desired, one or more of the above-described functions may be optional or may be combined.

Although the method and apparatus have been described in connection with a 4G or 5G network, it will be appreciated that they are not limited to such networks and are applicable to radio networks of various different types.

Although various aspects of the methods, apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

4G/5G The Cellular 4th and $5t^h$ generation
ARQ Automatic Repeat Request
CAPEX Capital Expenditure
CDD Cyclic Delay diversity
dCW0 Modulation stage output symbols for codeword0
dCW1 Modulation stage output symbols for codeword1
DL Downlink
UL Uplink
eNB LTE base station (evolve Node-B)
FFT Fast Fourier Transform
iFFT inverse Fast Fourier Transform
HARQ Hybrid ARQ
LTE Long Term Evolution (4G cellular standard)
MAC Media Access Control
MAC/SCH L2 communication layer including MAC and scheduler
OPEX Operation Expenditure
PDSCH Physical Downlink Shared channel
PHY Physical Layer
QAM Quadrature amplitude Modulation
QPSK Quadrature Phase Shift Keying
RAN Radio Access Network
PRB Physical Resource Block
RB Map Resource Block Map
TTI Transmission Time Interval (1 mSec in LTE 4G)
UE User Equipment

What is claimed is:

1. An apparatus comprising:
   at least one processor; and
   at least one memory including computer program code which, when executed by the at least one processor, causes the apparatus to:
   determine, at a centralized processing apparatus of a wireless network, a first subset of downlink user plane data corresponding to one or more wireless user equipments at least by calculating input data required at each of one or more L1 PHY processing stages of a remote processing apparatus, wherein the first subset comprises bits required by a remote processing apparatus to select a first symbol for transmission to the one or more user equipments at a first time slot; and
   stream, via a fronthaul interface, the bits of the first subset followed by bits of one or more further subset of downlink user plane data, wherein the bits of the further subset of user plane data comprise only the bits required to select by the remote processing apparatus a next symbol for transmission to the one or more of the wireless user equipments at a next time slot immediately following the first time slot.

2. The apparatus of claim 1, wherein the one or more of L1 PHY processing stages of the remote processing apparatus comprise at least one of:
   a modulation stage;
   a layer mapping stage;
   a precoding stage; and
   a resource mapping stage.

3. The apparatus of claim 2, wherein calculating the required input data for the resource mapping stage comprises:
   determining a pointer to a resource element in a resource map for each of the user equipments scheduled during the first time slot based at least on:
      a first lookup table indicating if one of the user equipments is scheduled for a PDSCH symbol transmission on a given resource element, and
      a second lookup table indicating whether the given resource element is designated for PDSCH transmission,
   wherein each of the determined pointers is associated with an input symbol of the precoding stage.

4. The apparatus of claim 3, wherein the at least one memory including computer program code, when executed by the at least one processor, further causes the apparatus to:
   update, at the central processing apparatus, the lookup tables of one or more of the scheduled user equipments based on information received from a downlink data scheduler of the wireless network.

5. The apparatus of claim 3, wherein:
   calculating the input data of the precoding stage comprises: deriving from the determined pointers, a set of one or more of the pointers required for transmission of each of the symbols associated with each of the scheduled user equipments, and
   calculating the input data of the layer mapping stage comprises: associating each set of the pointers with a layer of each of the scheduled user equipments.

6. The apparatus of claim 5, wherein calculating the input data of the modulation stage comprises:
   selecting for each set of the pointers a corresponding input bit of the modulation stage based at least on: a number of layers and a number of codewords for the scheduled user equipment associated with the respective set of pointers.

7. The apparatus of claim 1, wherein streaming, via the fronthaul interface, comprises transmitting the bits of the first subset to a buffer of the remote processing apparatus, where the buffer provides the bits to a modulation stage of the processing apparatus.

8. The apparatus of claim 7, wherein the centralized processing apparatus transmits, for each of the user equipments, an indication of a first bit and a last bit of the downlink user plane data that is streamed to the buffer of the remote processing apparatus.

9. The apparatus of claim 8, wherein the indication of the first bit and the last bit is inserted within a header of the stream such the remote processing apparatus is configured to store the incoming stream in a proper location of the buffer of the remote processing apparatus.

10. The apparatus of claim 7, wherein the centralized processing apparatus comprises a buffer having a same structure as the buffer of the remote processing apparatus.

11. The apparatus of claim 10, wherein the streaming comprises:
    streaming, from the buffer of the centralized processing apparatus to the buffer of the remote apparatus via the fronthaul interface, all of the bits required to select the first symbol within a time equal to one time slot, and sending an indication of a first bit and a last bit of the next subset to enable all of the bits required to select the next symbol to be streamed to the remote apparatus buffer within the time equal to one time slot.

12. A method comprising:
    determining, at a centralized processing apparatus of a wireless network, a first subset of downlink user plane data corresponding to one or more wireless user equipments at least by calculating input data required at each of one or more L1 PHY processing stages of a remote processing apparatus, wherein the first subset comprises bits required by a remote processing apparatus to select a first symbol for transmission to the one or more user equipments at a first time slot; and
    streaming, via a fronthaul interface, the bits of the first subset followed by bits of one or more next subsets of downlink user plane data, wherein the bits of the next subset of user plane data comprise only the bits required to select by the remote processing apparatus a next symbol for transmission to the one or more of the wireless user equipments at a next time slot immediately following the first time slot.

13. The method of claim 12, wherein the one or more of L1 PHY processing stages of the remote processing apparatus comprise at least one of:
    a modulation stage;
    a layer mapping stage;
    a precoding stage; and
    a resource mapping stage.

14. The method of claim 13, wherein calculating the required input data for the resource mapping stage comprises:
    determining a pointer to a resource element in a resource map for each of the user equipments scheduled during the first time slot based at least on:
       a first lookup table indicating if one of the user equipments is scheduled for a PDSCH symbol transmission on a given resource element, and
       a second lookup table indicating whether the given resource element is designated for PDSCH transmission,
    wherein each of the determined pointers is associated with an input symbol of the precoding stage.

15. The method of claim 14, further comprising:
updating, at the central processing apparatus, the lookup tables of one or more of the scheduled user equipments based on information received from a downlink data scheduler of the wireless network.

16. The method of claim 14, wherein:
calculating the input data of the precoding stage comprises: deriving from the determined pointers, a set of one or more of the pointers required for transmission of each of the symbols associated with each of the scheduled user equipments, and
calculating the input data of the layer mapping stage comprises: associating each set of the pointers with a layer of each of the scheduled user equipments.

17. The method of claim 16, wherein calculating the input data of the modulation stage comprises:
selecting for each set of the pointers a corresponding input bit of the modulation stage based at least on: a number of layers and a number of codewords for the scheduled user equipment associated with the respective set of pointers.

18. The method of claim 12, wherein streaming, via the fronthaul interface, comprises transmitting the bits of the first subset to a buffer of the remote processing apparatus, where the buffer provides the bits to a modulation stage of the processing apparatus.

19. The method of claim 18, wherein the centralized processing apparatus transmits, for each of the user equipments, an indication of a first bit and a last bit of the downlink user plane data that is streamed to the buffer of the remote processing apparatus.

20. A computer program product comprising a non-transitory computer-readable medium bearing computer program code, which when executed by a device, causes the device to perform:
determining, at a centralized processing apparatus of a wireless network, a first subset of downlink user plane data corresponding to one or more wireless user equipments at least by calculating input data required at each of one or more L1 PHY processing stages of a remote processing apparatus, wherein the first subset comprises bits required by a remote processing apparatus to select a first symbol for transmission to the one or more user equipments at a first time slot; and
streaming, via a fronthaul interface, the bits of the first subset followed by bits of one or more next subsets of downlink user plane data, wherein the bits of the next subset of user plane data comprise only the bits required to select by the remote processing apparatus a next symbol for transmission to the one or more of the wireless user equipments at a next time slot immediately following the first time slot.

* * * * *